Figure 1:
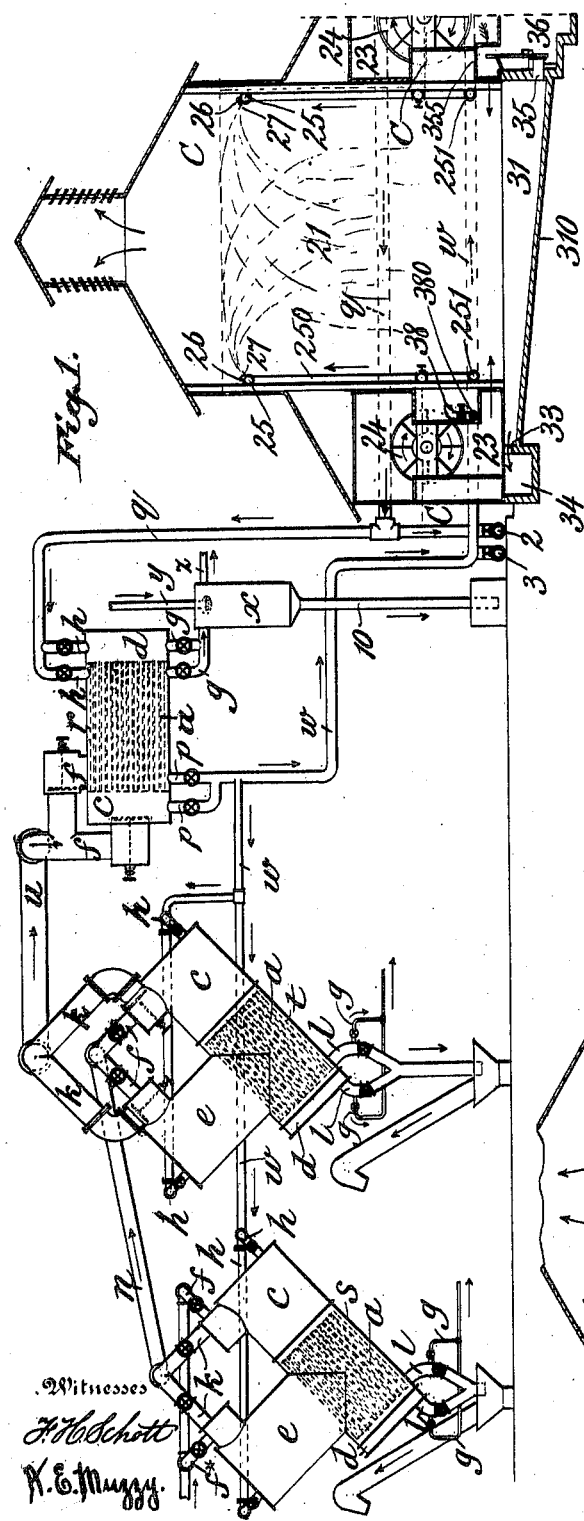

H. FRASCH.
SALT MAKING.
APPLICATION FILED NOV. 13, 1899.

1,006,196.

Patented Oct. 17, 1911.
6 SHEETS—SHEET 1.

Witnesses
F. H. Schott
K. E. Muzzy

Inventor
Herman Frasch
by Chas. J. Hedrick
his attorney

H. FRASCH.
SALT MAKING.
APPLICATION FILED NOV. 13, 1899.

1,006,196.

Patented Oct. 17, 1911.
6 SHEETS—SHEET 2.

Witnesses
F. H. Schott
R. E. Muggy

Inventor
Herman Frasch
by Chas. J. Hedrick
his attorney

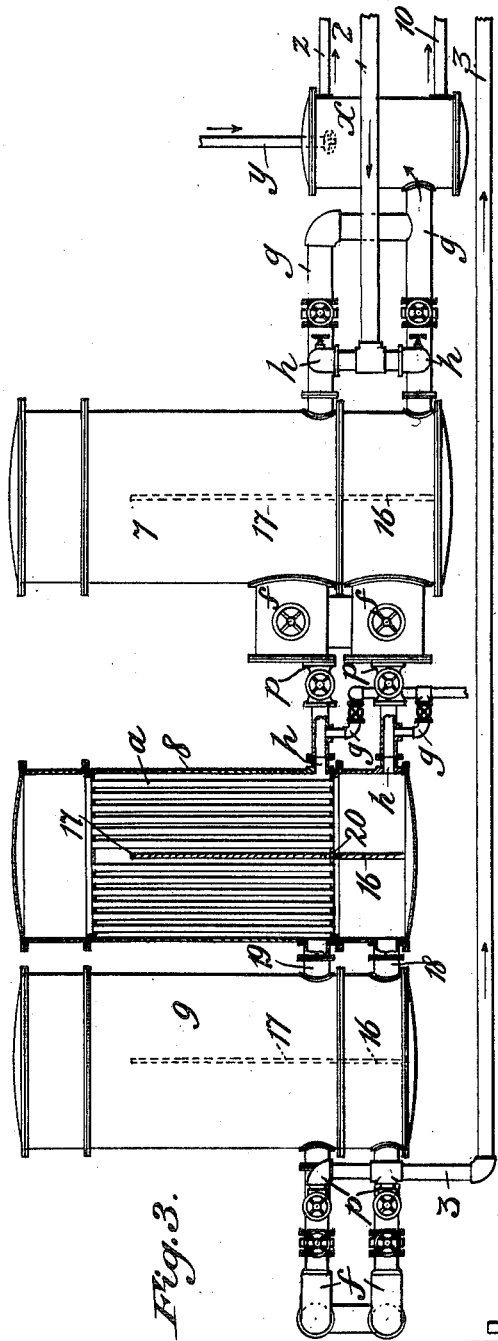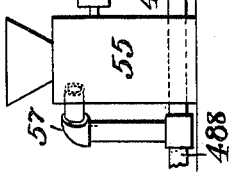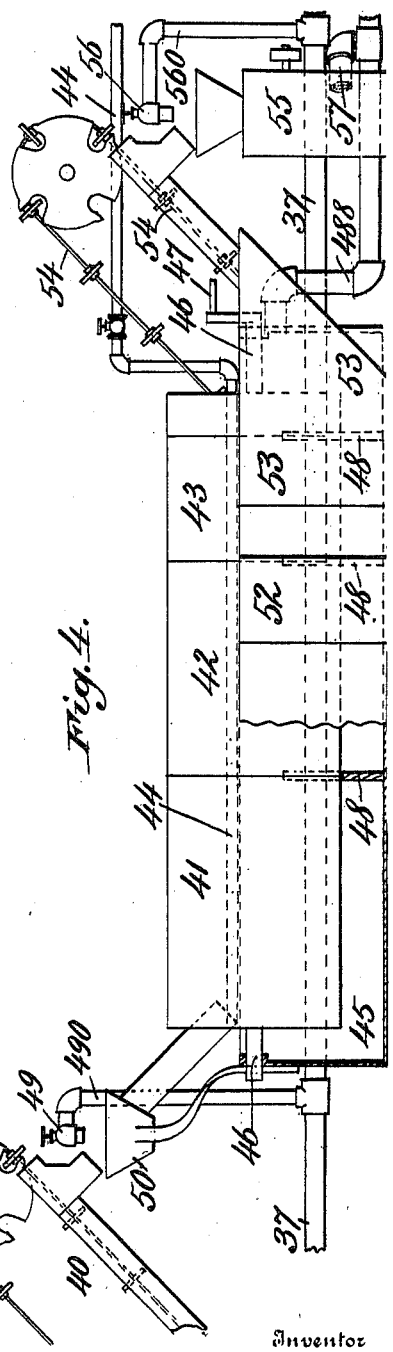

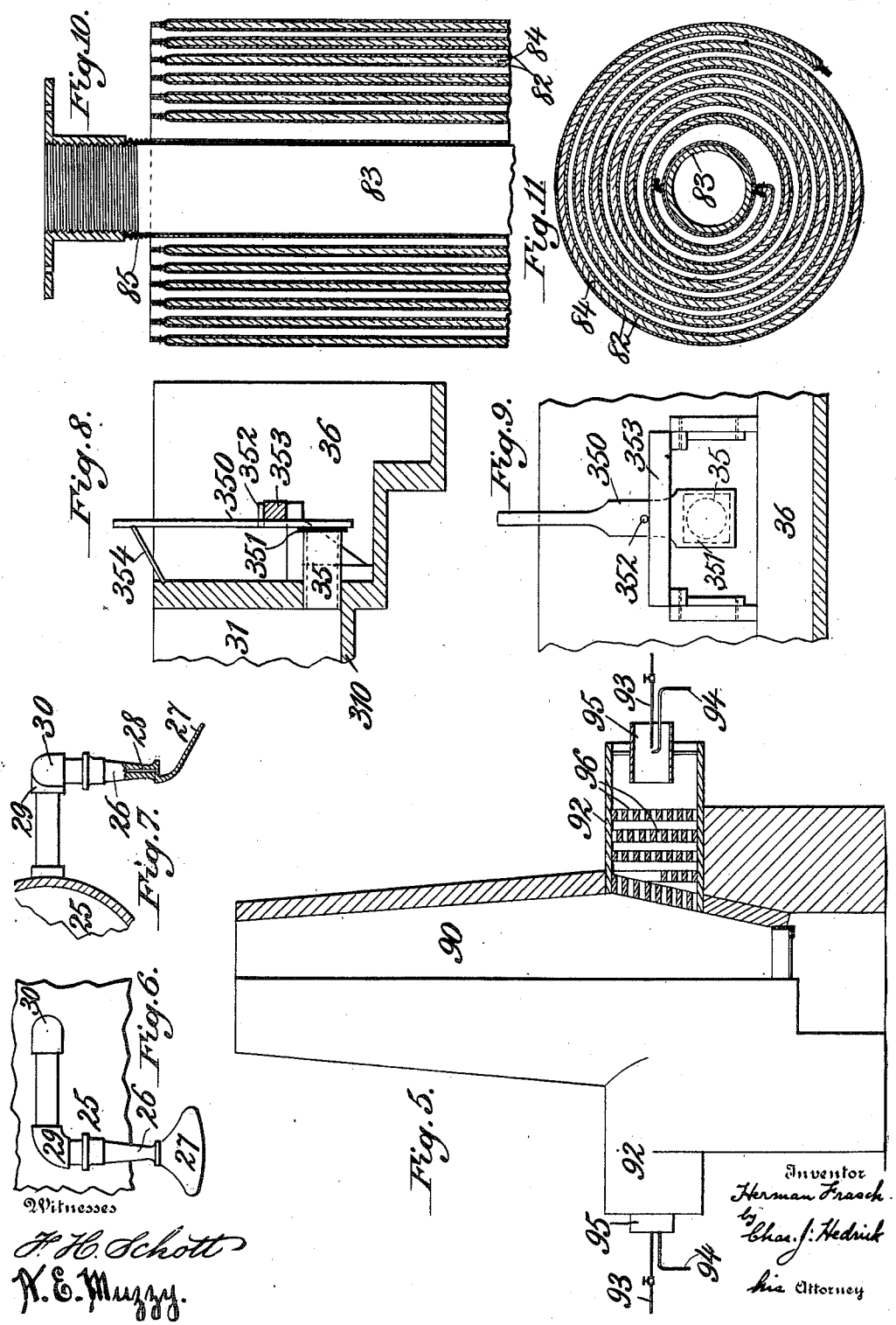

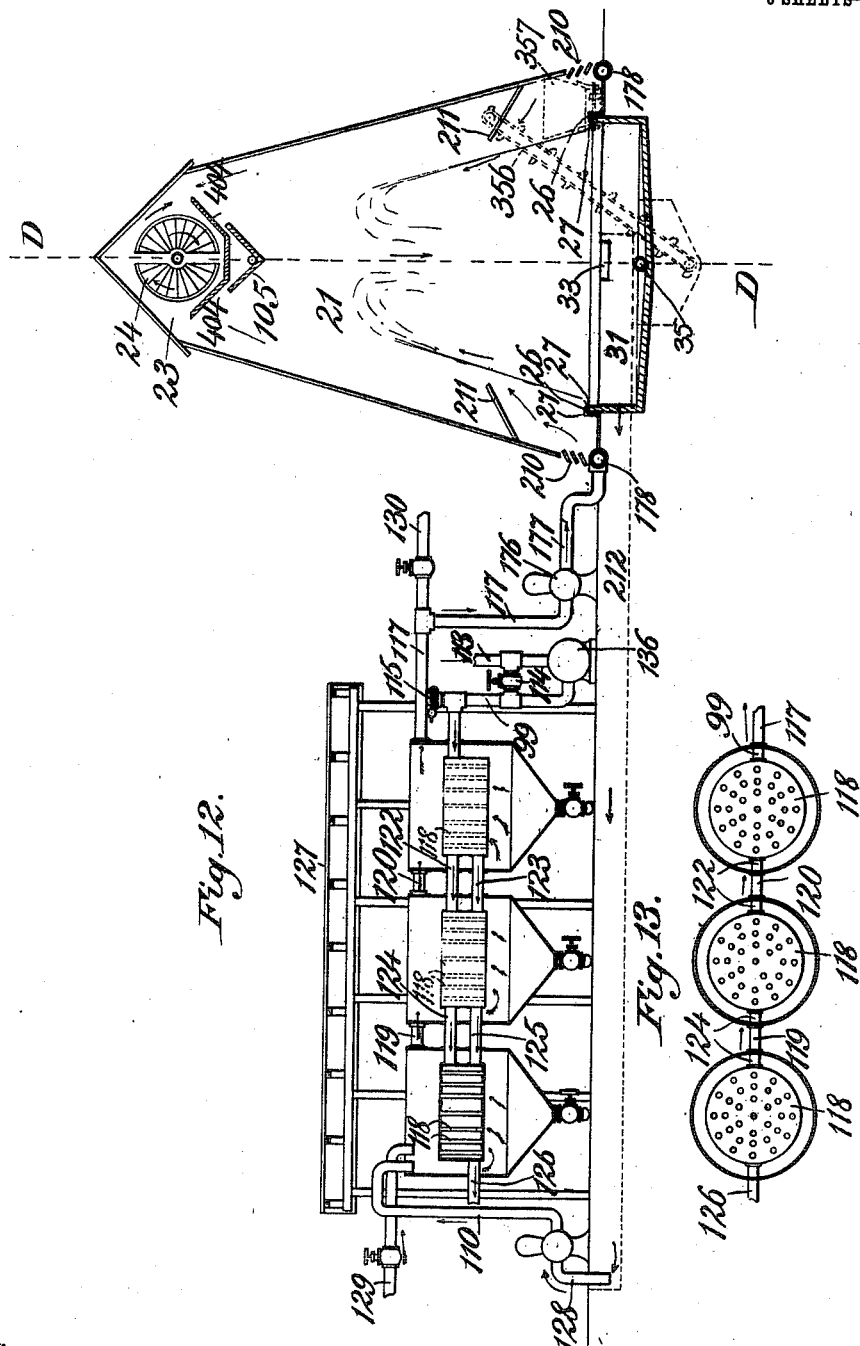

H. FRASCH.
SALT MAKING.
APPLICATION FILED NOV. 13, 1899.
1,006,196.
Patented Oct. 17, 1911.
6 SHEETS—SHEET 6.
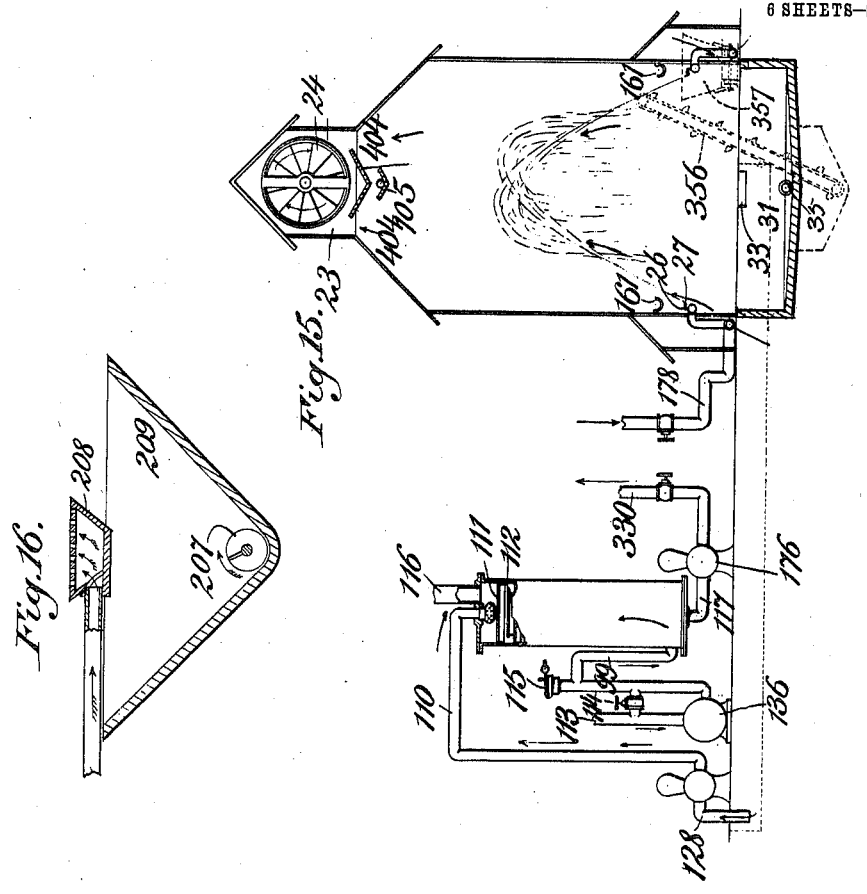
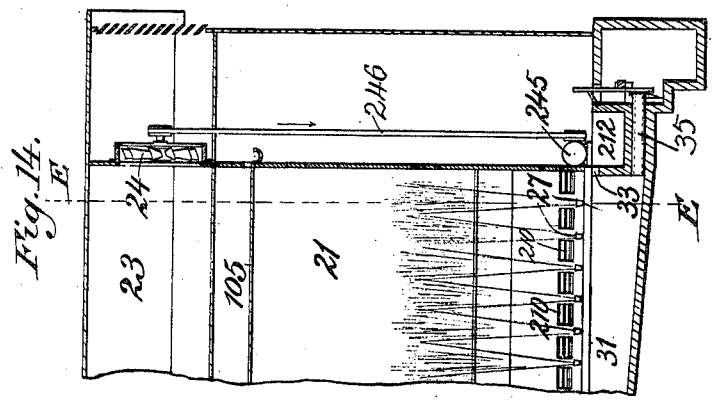
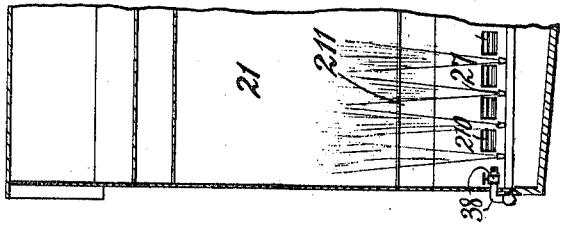

UNITED STATES PATENT OFFICE.

HERMAN FRASCH, OF CLEVELAND, OHIO, ASSIGNOR TO THE UNITED SALT COMPANY, OF CLEVELAND, OHIO, A CORPORATION OF OHIO.

SALT-MAKING.

1,006,196.    Specification of Letters Patent.    Patented Oct. 17, 1911.

Application filed November 13, 1899. Serial No. 736,842.

*To all whom it may concern:*

Be it known that I, HERMAN FRASCH, a citizen of the United States, residing at Cleveland, in the county of Cuyahoga and State of Ohio, have invented certain new and useful Improvements in Salt-Making; and I do hereby declare the following to be a full, clear, and exact description of the invention.

This invention relates to a process of salt making and to products obtainable by said process. In accordance with said process, saturated brine of an appropriate temperature is exposed unsupported in the form of drops to an evaporation-promoting atmosphere (or, in other words, to an atmosphere in which the tension of the water vapor present is less than the vapor tension of the brine exposed thereto) in such manner that the evaporation proceeds more rapidly than the crystallization and that consequently the brine becomes super-saturated; and this supersaturated brine (with or without further evaporation) is allowed to precipitate the salt either while sufficiently quiet to allow the fine grains of salt to settle or while in sufficient motion to keep them from settling or while flowing over a suitable bed (surface) in such volume and at such speed that the fine grains of salt are carried along with the current, or partly in one and partly in another or others of said modes.

It is advantageous in the exposure of the brine unsupported in drops so to adjust the conditions (namely the size of the drops, the time of exposure and the difference between the tension of the water vapor in the atmosphere of evaporating chamber and that of the brine) that precipitation takes place in the drops of supersaturated brine, while these are passing through the atmosphere or as they reach an underlying body of brine. Further in accordance with the process of the present invention, the precipitated salt is recovered and treated and the residual brine is treated and reëxposed to evaporation, as will hereinafter be more particularly set forth.

One of the new products of the present invention, is a fine salt, whose particles are composed of small cubes which in general exhibit under the microscope, a transparency, a surface smoothness, a straightness and sharpness of edge, and a sharpness of corners apparently perfect. In these respects the said salt is in marked contrast with a fine grade of salt made in vacuum pans with which it has been compared, the cubes of the vacuum salt in general exhibiting under the microscope a partial opacity, a roughness of surface, an irregularity and roundness of edges, or a roundness of corners. To an inspection with the naked eye, the new salt is white with a highly vitreous luster and sparkling appearance, in comparison with which the most sparkling previously made salt with which I am acquainted has a dull appearance. A sparkling appearance is valued especially in salt for table use; and the new salt in consequence is peculiarly fitted for such use; but it can be used for any other purpose for which a fine salt is suitable. I have obtained this new fine salt by forcing brine just below saturation and of from about 145° F. to 166° F. temperature, under a pressure from about 20 lbs. to 30 lbs. to the square inch through circular orifices of between $\frac{1}{3}$ and $\frac{1}{4}$ inch diameter against inclined spatter plates for spreading the jets and breaking them into drops, the broken jets being discharged horizontally into the constantly renewed atmosphere of a large room about twenty feet from the level of a body of brine which occupies a vat at the floor of the room, and which receives the falling brine drops. The air to renew the atmosphere in the said room has been taken from the outside atmosphere without artificial raising of temperature, and has been introduced in moderation and not in such manner as to convert the room practically into a flue. The precise conditions given are merely by way of example, as exhibiting one set of sufficient conditions; these may be varied, provided a sufficient rate of evaporation and time of exposure of the drops are obtained to effect a precipitation of salt in the drops of supersaturated brine. The artificial heating of the air introduced into the room can be resorted to, if preferred; and it may sometimes be desirable, where otherwise a sufficient rate of evaporation of the falling brine would not be induced; but in my experience it has not been found necessary to resort to it.

Another of the new products of the present invention is a supersaturated brine holding in solution at or above atmospheric temperature, enough salt, (say above one-half per cent. in excess of saturation) for it to serve as a source of industrial production of salt irrespective of any loss of water or of heat. Such loss may take place, but it is not essential to the precipitation of the salt. Such a solution can be obtained by the suitable exposure of the brine in drops to an evaporation-promoting atmosphere. Under the conditions above given by way of example, for the production of said fine salt and after precipitation of a considerable quantity of salt of supersaturation, I have obtained a solution having a temperature of 98° F. and containing in excess of solution one and two one-hundredths per cent. (1.02%) of the weight of saturated brine.

A third of the new products of the present invention consists of a coarse salt, whose particles are white with a semi-vitreous or sub-vitreous luster, are of skeleton forms, and are composed largely of grooved plates united to each other at an angle of 120°. In many particles three of these plates are united at a common line, about which they are regularly arranged; so that, when the particles are viewed endwise, said plates can be seen standing out like wings separated from one another by the angle of 120°. The grooves are oblique to said line. The three plates in a given particle are not usually (if ever) of the same size, or in other words they do not project the same distance from the line of joining. The particles vary in size. The grooves are constituted by the spaces between ribs which latter are formed of minute cubes grown together in lines with spaces (the grooves in fact) between the lines and united to or into the plate, on each side whereof the ribs appear. This coarse salt is well adapted to packers' use; but it can be applied to other uses; and if too coarse for a particular use it can be ground. Whether or not the characteristic skeleton formation shall remain sufficiently in the ground product to distinguish it, will of course depend upon the extent to which the grinding may be carried. The width of the grooves is under one two-hundredths of an inch and I have obtained them in fact approximately one five-hundredths of an inch across.

The new coarse skeleton salt is obtainable by precipitation from the supersaturated solution on standing, or what is the same thing, moving too slowly to keep the fine salt in suspension in the current. Its production is not dependent upon any loss of heat or water by the supersaturated solution; but it may be advantageous to promote evaporation and consequent cooling in order to increase the yield.

Practically I have obtained the fine salt (above) and the coarse skeleton salt in admixture with each other by receiving the brine drops in a standing body of supersaturated brine supplied by said drops. In order to separate the products the mixture is sifted; and this sifting is advantageously performed under brine or with the aid of a current of brine flowing through the sieve with the finer particles of salt, or (best) under brine with said current. This method of sifting salt is applicable to the separation of the coarse skeleton salt into different sized particles.

The fourth of the new products of the present invention consists of a compact salt, radically different from either of the preceding. It exhibits a columnar structure, unless in lumps of too small dimensions. It has been obtained in one form in which the columns are only slightly adherent, and in a second form in which the columns are cemented firmly together. It is in this latter form that it is specially useful, (although both forms are within the invention), as in such form, the lumps retain their form in dissolving and consequently dissolve with comparative slowness. This compact salt is therefore well adapted to use for capping, that is to say for placing between the heads of a barrel and its contents of pork or beef or the like. Rock salt and solar salt have heretofore been used for the purpose; but the former has to be mined in solid form and is only to be had in places where nature may have placed accessible deposits or within such moderate distances that the transportation expenses do not become prohibitive; and the manufacture of solar salt demands much ground for the plant and a long time (as well as much hand labor) for its production. Ordinarily it takes about six months to grow the solar salt for a harvest. By the present invention, the new compact salt can be grown rapidly, and wherever a supply of brine is available. Moreover, rock salt contains considerable dirt and insoluble residue; and all the solar salt which I have known has likewise been contaminated with dirt, it being practically impossible to exclude dirt during the long period of its growth; whereas the compact salt of the present invention can be produced white and pure. A solid lump of this latter salt has a specific gravity of about 2 (2.079 has been observed) and a hardness of about 2 in Moh's scale of hardness, being harder than gypsum and softer than galena. The streak is white.

The compact structure in small and the compact columnar structure in larger, lumps will distinguish this new salt from rock and solar salts, which have not far from the same specific gravity and hardness. In fact in the new salt the cubes would not be noticed by the ordinary observer, although small crystal faces would be plainly apparent at intervals; whereas in rock and in solar salt there are large prominent crystal cubes.

The new compact salt is obtainable by running supersaturated brine (which is most advantageously produced by exposing saturated brine unsupported in drops to an evaporation-promoting atmosphere under appropriate conditions) over a bed (or in other words, a surface of any suitable description) at such speed and in such volume as to carry the fine particles of salt along with the current. A compact columnar growth of salt takes place at right angles to the current, the growth being on the ends of the columns over which the supersaturated brine passes. Masses of apparently indefinite extent can thus be grown. When the bed is formed by a flat surface the columns are all parallel, but when the bed surface is curved the columns radiate, being normal to said surface. Thus, if the supersaturated brine flow over the edge of a board, the columns radiate in planes at right angles to said edge. As first obtained the columns do not adhere; but on drying they become cemented firmly together. The salt can be reduced to lumps or particles of whatever size may be desired. Where the flow of brine is stopped and then resumed, the salt may exhibit lines of parting at the points to which it had grown at the time of the stoppage.

The compact salt from the flowing brine is best dried in large lumps, say the size of a man's fist or two fists, or even larger, at about 300° F. to 400° F. by currents of hot air, or more especially currents of air heated by and mingled with the products of the combustion of liquid hydrocarbons (petroleum oils). These give no ash; and they can be burnt completely so as not to soil the salt with soot. The reduction of lumps to any grade as common fine, packers, capping, or other, can be effected in the way and by the same means employed for rock or solar salt.

The fifth of the new products of the present invention, is a fine salt, characterized by the smallness of its cubes, which are considerably under one two-hundredths of an inch across each of the six faces. The cubes are fairly perfect; the luster is vitreous; and the sparkle will compare favorably with that of any salt known to me as being produced prior to my invention or discovery of the fine salt which constitutes the first mentioned of the new products of the present invention. The minute cube salt has, however, not been obtained with its cubes of the transparency, smoothness and sharpness of edge and corner, which is characteristic of the said fine salt. The new minute cube fine salt is suitable for table and dairy use and generally wherever the fineness of its cubes would be desirable or at least not prohibitive. As compared with the specimens of vacuum salt hereinabove mentioned, its cubes are about one one hundred and twenty fifth of those of the vacuum salt, whose cubes were approximately one one-hundredth of an inch each way, or in other words, about five times those of the minute cubes.

The minute cube fine salt is obtainable by precipitation from supersaturated brine while this is in sufficient motion to keep said salt from settling. It is obtainable concurrently with the before mentioned compact salt, the former precipitating out of the moving brine and being carried off by the stream. Its presence in the growth would impair the cohesion and consequently the usefulness for capping or like purpose; and it is important therefore in the preparation of the compact salt to have a sufficient volume and velocity of current to carry the fine particles away. The salt thus levigated (or in other words carried away by the running brine) will settle out when the brine is sufficiently at rest.

The apparatus, for carrying out the present invention may be composed of an evaporating chamber, sprinklers therein for exposing the brine unsupported in drops to the evaporation-promoting atmosphere, and one or more of the following means for separating the salt from the brine, namely, a receiver (settling vat) wherein the brine may repose in sufficient quiet to permit the fine salt to settle, a receiver or receivers wherein the brine is allowed to precipitate salt while in sufficient motion to keep the fine salt from settling and then is allowed to repose, and a receiver (salt-growing bed) wherein (or whereover) the brine flows in such volume and at such speed as to carry the fine salt along with the current. The last-mentioned receiver (salt-growing bed) furnishes of course a receiver in which the brine is allowed to precipitate salt while in motion as before mentioned, and in connection with an additional receiver (settling vat) for the repose of the brine will constitute the second mentioned receiver; but these do not necessarily involve a receiver of the third mentioned kind; since the motion could otherwise be imparted than by the flow of a stream; and the precipitation in moving brine and the subsequent repose of said brine might take place in the same receptacle (vat). The apparatus may also include means for removing salt from the vats, for treating portions (at least) of the removed salt and for treating and returning the residual brine to the sprinklers of the evaporating chamber, and for delivering other brine to said sprinklers, as will be hereinafter set forth.

Figure 2:
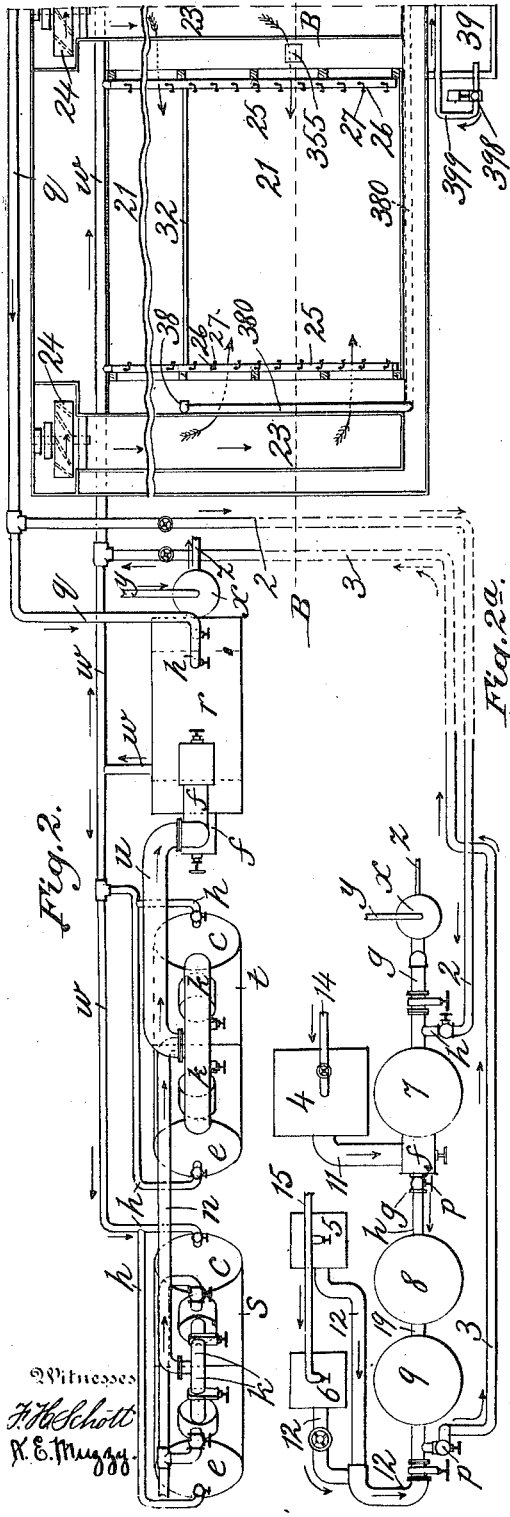
Figure 2A:
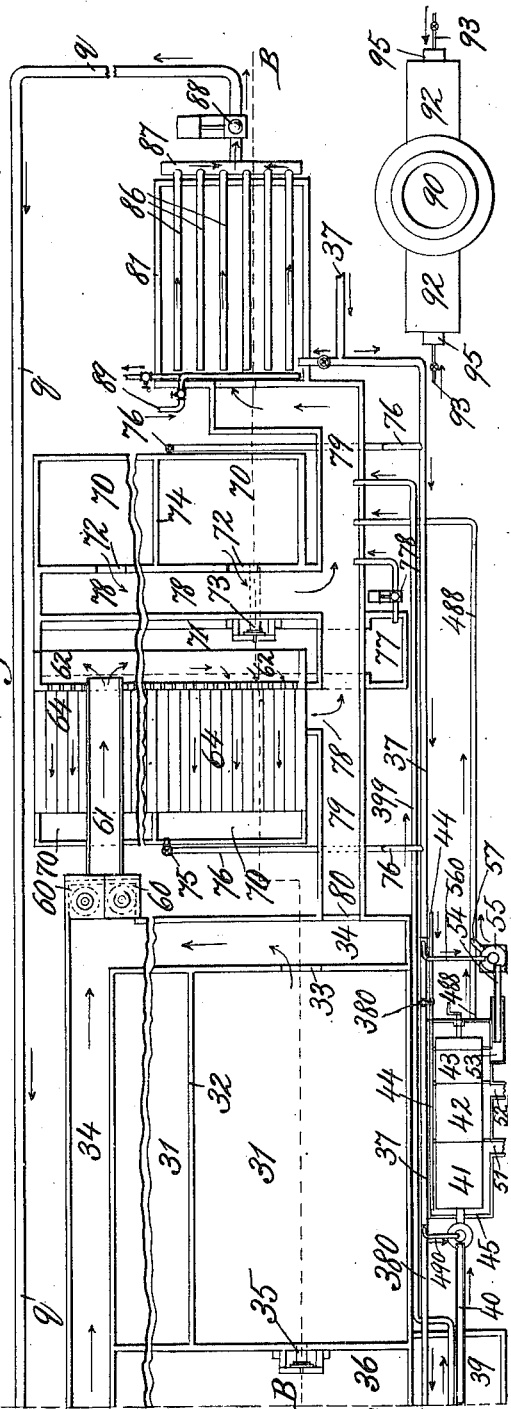

In the accompanying drawings which form part of this specification—Figures 1 and 1ᵃ, and Figs. 2 and 2ᵃ, taken together form diagrammatical views of a salt-making apparatus (plant) useful to carry out the invention, Figs. 1 and 1ᵃ showing the said plant partly in elevation and partly in vertical section on line B B of Figs. 2 and 2ᵃ, and these latter showing it partly in plan, and partly in horizontal section on line C C of Figs. 1 and 1ᵃ; Fig. 3 is an elevation (partly in section) on a larger scale of the heating apparatus shown in plan at the lower left hand corner of Fig. 2; Fig. 4 is an elevation partly in section and on a still larger scale of the sifting and grinding apparatus, indicated in plan at the lower left hand part of Fig. 2ᵃ; Fig. 5 is a view half in elevation and half in vertical section of the salt drier or kiln, shown in plan at the lower right hand corner of Fig. 2ᵃ, the scale being the same as that of Fig. 3; Figs. 6 and 7 are detail views in plan and in profile respectively and on a larger scale than any preceding figure of one of the sprinklers for the evaporation chamber and of an adjustable mounting for said sprinkle; Figs. 8 and 9 are detail views in vertical section, partly in elevation, and in face view respectively, of the means for closing the draw off of one of the compartments of a settling vat, the scale being the same as that of Fig. 4; Figs. 10 and 11 are views in vertical and cross section respectively of one of the elements of the filter shown at the right hand end of Figs. 1ᵃ and 2ᵃ, Fig. 10 showing only part of the length of the element and both figures exhibiting the filtering bag so wound as to show the convolutions separately, and the scale of Figs. 10 and 11 being a little less than that of Figs. 6 and 7; Fig. 12 is a diagram partly in vertical section and partly in elevation of a modified plant also within the invention, but not exhibiting all parts or features thereof; Fig. 13 is a plan of the heater of Fig. 12; Fig. 14 is a partial view in vertical section on line D D of Fig. 12 of the evaporating chamber thereof; Fig. 15 is a diagram partly in vertical section and partly in elevation of another modified plant within the invention, but not exhibiting all parts or features thereof; Fig. 16 is a view in section of still another arrangement of settling vat and sprinkler; and Fig. 17 is a view illustrating a modified arrangement of a pipe connection.

As shown in Figs. 1 and 2, one part of the brine to be exposed unsupported in drops is delivered through the pipe $q$ to a heater $r$ at the salt works, which heater $r$ furnishes the last effect of a multiple effect evaporating apparatus, the pipe $f^*$ delivering the steam to the first closed evaporating pan $s$, the steam from the boiling brine in this pan being delivered by the pipe $n$ to the second closed evaporating pan $t$, and the steam from the boiling brine in this latter being delivered by the pipe $u$ to the said heater $r$. The evaporating pans and the heater could have each a brine chamber (always used as such) separated by heat conducting walls from the steam chamber (always used as such); but as shown the chambers separated by the heat conducting walls are each provided with both brine and steam inlets and corresponding outlets so that each chamber can be used in turn for brine and for steam. The heat conducting walls are preferably made (as usual in vacuum pans) by metal tubes $a$ secured between tube sheets, one chamber being constituted by the space outside of the said pipes and the other by the spaces inside of the same. In the evaporators $s$ and $t$ the end chambers $c$ $d$ beyond the tube sheets communicate with and connect the spaces inside the tubes $a$ of the corresponding evaporators; while the left hand domes $e$ respectively communicate with the spaces outside the tubes $a$. The central tube $a$, or at least one of the tubes $a$, should be of large diameter for the free passage of the current downward; and some of the tubes $a$ should be omitted to form a similar passage for the other chamber which surrounds the tube $a$. In the heater $r$, the end chambers $c$ $d$ communicate with the spaces inside of the tubes $a$.

A valved steam inlet $f$ and a valved brine inlet $h$ are shown for each chamber of the evaporators $s$ and $t$; so also there are valved outlets $q$, $l$ and $k$, for each chamber, for the water, the salt and the exhaust steam, respectively. The pipe $n$ connects the exhaust steam outlets $k$ of the closed evaporator $s$ with the steam inlets $f$ of the closed evaporator $t$, the right hand end of said pipe or conduit $n$ having a valved branch leading to each dome of said evaporator $t$.

The heater $r$ has for each of its chambers a valved steam inlet $f$, a valved outlet $g$ for the condensed steam, a valved brine inlet $h$, and a valved outlet $p$ for the heated brine. Both its steam inlets $f$ are connected by the pipe or conduit $u$ with the exhaust steam outlets $k$ of the closed evaporator $t$; while its brine inlets $h$ are formed by branches of the pipe $q$; and its brine outlets $p$ are formed by branches of the pipe $w$. As shown, the brine supply of the evaporators $s$ and $t$ is taken from the pipe $w$ in order to have heated brine; but the supply for either or both evaporators could be taken from the pipe $q$ or from any source. The evaporators $s$ and $t$ could be worked at other temperatures and pressures; but it will generally be most advantageous to have a vacuum (subatmospheric pressure) above the brine in the evaporator $t$ and atmospheric pressure above the brine in the evaporator $s$, this being supplied with live steam from any suitable source, while steam at 212° F.

is supplied from the boiling brine in the evaporator *s* to heat the boiling brine in the vacuum of the evaporator *t*, and vacuum steam is supplied to the heater *r*. In condensing in one chamber of the vessel *r*, the steam imparts its heat through the wall of the pipes *a* to the brine in the other chamber of said vessel *r*; so that the temperature of said brine is raised as near as may be economical to the temperature of steam under the degree of vacuum in the brine holding chamber of the closed evaporator *t*. A certain working difference is essential; and, in order to reduce this difference without unduly increasing the area of the condensing and heating surfaces, it is advantageous to supplement the surface action of the vessel *r* by the direct action of a jet (injection) condenser and an air pump. As shown, the valved outlets *g* are constituted by large pipes so as to form conduits for the uncondensed as well as for the condensed steam (water of condensation); and said pipes are connected with the direct (injection) condenser *x* having an injection pipe *y* for water or brine and a pipe *z* leading to an air pump (not shown). The condenser *x* has an outlet pipe 10 at the bottom for withdrawing the water or brine of injection, together with the water of condensation; and said pipe (sealed at the bottom) may be made of sufficient vertical length to counteract the vacuum in said condenser *x* (or it can be connected with a pump for removing the water).

The means for aiding the vacuum should be used, whether the two chambers of the surface condenser be or be not provided each with valved inlets for both brine and steam and valved outlets for the products of both heating and condensation as above set forth. If the preceding effect (the pan *t* as shown) evaporate brine under atmospheric pressure, the direct (injection) condenser and air pump would be unnecessary. In such case the pan *t* would receive steam under superatmospheric pressure from the boiling brine in the pan *s*.

Under each of the evaporating pans *s* and *t* is shown a vat for sealing the lower end of the salt outlet pipe and an elevator for removing the salt; but these are ordinary devices and form no part of the present invention.

As shown in Figs. 1 and 2, another part of the brine to be evaporated by exposure in drops is conveyed to a distance by a pipe line to and from outside premises where a supply of exhaust steam is available. The pipe 2, which is a branch or continuation of the pipe *q*, conducts the brine to the outside premises, and the pipe 3, which is a branch or continuation of the pipe *w*, conducts it back again. These pipes would always be longer than the pipes which supply steam to the heaters at said outside premises, inasmuch as the advantage of transferring the brine from the salt plant to the outside premises and back again results from the inability economically to convey steam, and particularly exhaust steam, beyond comparatively short distances, in view of the injurious back pressure which more than such short conveyance would produce in the case of exhaust steam (unless expensive pumping should be resorted to) and also of the higher cost of transferring steam in comparison with the transfer to an equal or even to a double distance of liquid to be heated by the steam. The brine can be sent to and returned from any desired distance, provided the loss of heat by the returning brine is not so large as to destroy the profit from the use of the exhaust steam. To diminish such loss, the return pipe 3 can be protected by a non-conducting covering. At the outside premises (or in other words the distant heating station) a condensing engine 4 and two non-condensing engines 5 and 6 are supposed (as illustrated) to supply the exhaust steam for heating the brine of the pipe line 2 and 3, and a system of heaters, 7, 8 and 9, is shown adapted to such supply. The heaters shown are moreover of the new incrustation-removing type before described in which each chamber in the several heaters is provided with a valved brine inlet *h*, a valved brine outlet *p*, a valved steam inlet *f*, and a valved outlet *g* for the condensed steam (together with any steam not condensed in passing through the heater). The heater 7 is shown with partitions 16 and 17 (see Fig. 3), which partly divide the two chambers of said heater so as to increase the travel of the steam and brine. It is intended to be supplied through the pipe 11 with vacuum steam from the condensing engine 4 (itself supplied with live steam through the pipe 14); and in order to aid in maintaining the vacuum the direct (injection) condenser *x* with its injection pipe *y*, pipe *z* to air pump (not shown) and pipe 10 to water pump (not shown) is provided. The other heater is composed of two vessels 8 and 9 with partitions 16 and 17 therein; and these two vessels are connected in series by pipes 18 and 19, which serve (in turn) for both steam and brine. At 20 in each partition 17 is a hole for the passage of the condensed steam. No valves are needed for the pipes 18 and 19, and there may be as many vessels as desired so connected in series without intermediate valves; the valved outlets and inlets at the ends of the series sufficing for all when the steam pressure is the same in all.

The heater 8 and 9 is connected in series with the heater 7; but separate valves are shown for each; because it is intended to supply exhaust steam at atmospheric pressure to the heater 8 and 9, but (as before said) to supply vacuum steam to the heater 7. The pipe 15 with its branches, supplies live steam to the non-condensing engines 5 and 6, whose exhaust steam (at atmospheric pressure) is supplied by the pipe 12 (with its branches) to the inlets $f$. The brine from pipe 2 passes first through the heater 7 wherein it is raised to as high a temperature as practicable by the vacuum steam from the condensing engine 4, and then through the heater 8 and 9 where it is raised as near 212° F. as practicable by the exhaust steam from the non-condensing engines 5 and 6. The heated brine is delivered to the salt-works by the return pipe line 3.

The heating system at the outside premises (or distant heating station) is to be modified in accordance with the supply of steam available at such station, a greater or less number of heaters being used and being adapted for exhaust steam at atmospheric pressure or at sub-atmospheric pressure (vacuum steam) or (as in the drawing) for both, according to circumstances. Of course, more or less live steam can be utilized when desired by reduction in pressure, or (in approximate cases) at super-atmospheric pressure.

Heaters 7, 8 and 9 which operate by surface condensation have been described; but those in which there is direct condensation of the steam in contact with the brine to be heated can be utilized when the heated brine can be restored to or near saturation while still at an elevated temperature before said brine is exposed in drops to the evaporating atmosphere. A direct condensing heater is shown in Fig. 15 as hereinafter described.

The evaporator wherein the brine is exposed in drops is composed of one or more evaporating chambers 21 with sprinklers therein, and means for supplying air to said chamber and brine to said sprinklers. As shown there are two such chambers, which are duplicates of each other so far as their essential parts are concerned, but which are joined together so as to have certain conduits in common as explained below. Each chamber is in the form of a large room and is supplied with air through one or more ducts 23, whose area in cross section is much less than that of the chamber 21, (supplied thereby) and through which air is forced by fans 24. By making the cross section of the evaporating chamber so much larger than the ducts, containing the fans, there is in said chamber a slow-moving current of large cross section; and consequently there is no danger of even the small brine drops (which it is important to produce) being carried against the walls of the chamber, as would be the case of the brine drops were showered in a chamber equal to or approximating the air ducts in area. As shown there are three such conduits, the middle one delivering air to both the evaporating chambers. They deliver the fresh air at the bottom of the chambers, the moisture laden air escaping at the top. The sprinklers of each chamber are most advantageously arranged to inject the brine horizontally across the slow-moving current of air therein, in order that the injected brine may induce transverse currents or whirls in the atmosphere and thereby mix together all parts of the air. The said sprinklers may be variously constituted; for example one way would be to form them by making orifices in the sides of the horizontal brine supply pipes 25; and other ways will suggest themselves; but what is considered best is to form them of nozzles 26 provided with inclined spatter plates 27 (Figs. 6 and 7) in front of the jet orifices 28. This form is desirable because the spatter plates break the jets of brine into drops, which become smaller as the pressure is increased; so that the brine can be exposed in drops of a smallness conductive to rapid evaporation without making them so small as to be suspended in and carried off by the current of air. It is also an advantage to mount the sprinklers adjustably on their supply pipes. For this purpose, there are two elbows 29 and 30 (Figs. 6 and 7) between the sprinkler nozzles 26 and the brine supply pipes 25, so that the said nozzles can be turned in all directions. The horizontal brine pipes 25 are connected by vertical pipes 250 which connect with branches 251 of the pipe $w$. In order to utilize to the best advantage the space within the evaporating chamber, two or more rows of sprinklers are provided at the sides of the chamber and arranged so that their trajectories intersect as shown.

At the floor of each evaporating chamber is a vat 31 which may contain only one compartment; but in order to enable the vat to be emptied a portion at a time, it is advantageously divided into a number (two or more) of compartments by (one or more) partitions 32 (Figs. 2 and 2ª). In Fig. 2, the plane of horizontal section is near the upper part of the chamber 21 of Fig. 1, while in Fig. 2ª it is at the level of the top of the partition 32 of the vat 31 of Fig. 1ª. By having valves in the upright pipes 250, the supply of brine to the horizontal pipes 25 over any compartment can be cut off whenever desired.

Each compartment of each vat 31 is provided with an overflow 33 into a trough 34, and also with a draw off 35 normally closed and when open discharging into the conduit 36. For the more ready discharge of their contents, the compartments have their floors 310 inclined downward to their respective draw offs 35. Level floors could, however, be used. Suitable means for closing the draw offs are shown in detail in Figs. 8 and 9, and consist as shown of a lever 350 provided with a broad lower end and a packing disk 351 on the face of said end. A pin 352 upholds the lever by resting on the stationary cross piece 353; while the removable strut 354, by pressing out the upper end of the lever, holds the lower end with its packing disk 351 against the mouth of the draw off pipe 35. By removing the strut, the lever can be taken away. A trap door 355 (Figs. 1 1ª and 2) gives access to each strut 354.

The vats 31 receive the brine which has been discharged through the sprinklers 26—27 into the atmosphere of the evaporating chambers 21; and after an interval of standing, in which it deposits salt on the floors of the vats, the said brine overflows into the trough 34. When the desired depth of salt has accumulated on the floor of a compartment, the draw off 35 of said compartment is opened and the brine then escapes through it into the conduit 36. The salt can then be removed in any ordinary or suitable way; but it is considered most advantageous to wash it out by a stream of brine. For this purpose one or more hose plugs 38, connected with branches 380 of a brine pipe 37 leading from a salt well or other source of supply, are located at suitable points for enabling a hose attached to such plug to deliver a stream of brine to any part of the deposit of salt in any compartment, in order to wash out the said salt through the corresponding draw offs 35. Other arrangements for supplying streams of wash brine can be employed.

The conduit 36 leads to an elevator pit 39 from which the salt is taken by an elevator for delivery as may be desired. The elevator 40, which may be of any known or suitable description, but is shown (see Fig. 4) as composed of a trough with scrapers mounted on an endless wire rope (both scrapers and rope together with the means for attaching the scrapers to the rope being galvanized) is shown arranged to deliver the salt to the sieve 41—43 (Figs. 2ª and 4), for separating the salt into particles of different sizes. The sieve is in the form of a drum mounted in a box 45 on a shaft 46, with a crank 47 for moving the drum. In practice there would be mechanical means for moving the sieve constantly, preferably by giving it a nearly complete rotation back and forth; but such means are known and are no part of the present invention.

The sieve drum may have only one size of mesh or there may be different sizes over different sections of the drum, or different drums may be used. As shown, there is a drum with three mesh sections 41, 42, 43, and an underlying intermediate partition 48 (Fig. 4) after each section for keeping separate the sifted products. If it is desired to separate the salt from vats 31 simply into a finer and a coarser grade, it is recommended to use only two sieve sections of about 15 meshes and two meshes (more or less) respectively to the linear inch (to wit, sections of No. 15, and No. 2 wire cloth respectively), the section of smaller mesh separating the finer salt and the larger mesh allowing the rest of the salt to pass, but keeping back foreign objects, which are discharged over the solid section at the end of the drum. In operating in the most advantageous manner, another salt is obtained which is precipitated in the brine drops and afterward settles to the bottom of the vats, where it becomes mixed with the salt that both precipitates and deposits in the said vats. To separate this, a finer mesh is needed; it suffices to use a mesh of 30 to the linear inch (or, in other words, to cover the first section 41 of the drum with No. 30 wire cloth).

To aid the sifting of the salt, the sieve is submerged in a bath of brine and a stream of brine introduced into it. As shown, there is a faucet 49 on a branch 490 of the brine pipe 37 already mentioned, which faucet is immediately above the hopper 50 into which the salt is delivered by the elevator 40. By opening the faucet 49, therefore, a stream of brine enters the hopper 50 and is delivered into the sieve 41—43 by the spout of the hopper along with the salt from the elevator 40. The overflow 48 allows the brine to run off while maintaining a bath of brine in the box 45 of the sieve. A steam pipe 44 perforated at intervals is arranged along the sieve 41—43 on one side. By it steam can, at will, be injected against the sieve to clear its meshes of incrusting salt. A little water is formed by the condensation of the steam which suffices to clear the meshes, but occasions no appreciable loss of salt.

The compartments of the box 45 under the mesh sections 41—43 of the sieve are each provided with a bay 51, 52 and 53 respectively for receiving an elevator. The largest part of the bays 51 and 52 is broken away in Fig. 2ª. In order to enable it to be shown on the sheet, the bay 53 is turned so as to be parallel with the axis of the sieve. In it is shown the elevator 54 which delivers to the mill 55 the coarser portion of the salt which has passed through the meshes of sieve section 43. The mill may be of any suitable construction; a metal disk mill is recommended. Above its hopper is a faucet 56 on a branch 560 of the before mentioned brine pipe 37. By opening the faucet, brine will be supplied to aid the grinding operation. The brine runs off by the pipe 57 into the pipe 488; and the salt can be delivered by means (not shown) to any suitable receptacle (a drainage floor, a bin, a centrifugal machine or other, as the salt maker may determine). It will be observed that as described the salt has been ground without ever having been dried, it being delivered to the mill undried from the time of its precipitation.

Ordinarily it is the custom to sell salt with a certain percentage of water therein; and to remove this water in order to prepare the salt for grinding involves an expense which is saved by being able to grind salt undried. By suitably raising the outlet 57, as shown, for example, in Fig. 17, a bath of brine can be formed for submerging the grinding disks of the mill therein, which bath will serve a useful purpose with or without the stream of brine from faucet 56; but it is considered better to have the stream of brine without the bath. In the case of the sieve, it is considered most advantageous to have both a bath and a stream of brine; although either of them can be employed with useful effect without the other. The brine from trough 34 is delivered by the cataract pumps 60 to the trough 61 which supplies said brine to the distributing trough 62 of the salt growing bed. Any suitable arrangement of conduit for conveying the brine from the vats 31 to the upper part of the salt growing bed could be used; in fact, where the conditions are suitable, the brine might overflow from a vat 31 directly onto the said bed, the length of conduit in such case being only the thickness of wall of the vat; but in many cases it will be more convenient to have the salt-growing bed more or less removed from the vat or vats which are at the floor of the evaporating chamber, and also to have the upper end of said bed above the brine level in said vats; and in such case, the supersaturated condition of the brine makes it advantageous to employ one or more open conduits (troughs) for conveying and one or more cataract pumps for raising said brine. Cataract pumps are well known and consist essentially of a rotating screw (propeller wheel) in a large pipe (tubular case). The salt-growing bed may consist of any surface over which the brine can flow in suitable volume at proper speed. An inclined plane with a downward slant of one foot in twelve is recommended; but a greater or less slant may be used, provided the slant be not so small as to allow the deposit of fine salt to destroy the cohesion of the mass which collects on the surface; and the slant should be enough for the current to carry off all (or at least practically all) of the fine salt, which also precipitates (separates out of the solution by assuming the solid state) in the flowing brine. It is not necessary to employ a plane however; for a series of steps (even steps with horizontal tops) may be used; and indeed, in general, any form of surface may be used which furnishes something to which the salt can attach itself, while permitting a suitable flow of the brine.

A special improvement consists in making the bed proper of separable pieces (loose boards) 64 which rest upon suitable supports. As shown, the lower ends of the boards rest upon the cross piece 65 while their upper ends bear upon cleats 66 on the outside of the trough. If thought desirable a cleat can be fastened on the bottom of each board to rest against the cross piece 65 in order to keep the board from sliding. The separability of the pieces of the bed facilitates breaking up the mass of salt which grows thereon.

The volume of the streams flowing down the boards can be regulated by the size of the overflow notches 67 in the sides of the distributing trough 62 and by the height of the brine in said trough. The notches could moreover be dispensed with, the brine being allowed to flow in a sheet over the sides of the trough. The boards 64 may be a foot wide. An overflow notch 67 is shown for each board. One or more gates can be provided to vary the size of the notches or to close them at will.

Below the salt-growing bed 64 is the vat 70; or rather, there are two vats 70 one below each of the salt-growing beds 64, one of these being shown on each side of the distributing trough 62. The beds and vats are duplicates; but for compactness, the two beds are arranged to be supplied by the same distributing trough and the two vats to be drawn off into the same conduit 71. The vats 70 as shown, are practically identical in construction with the vats 31 hereinbefore described; but their overflows 72 and their draw offs 73 are placed at the same sides of the vats instead of at opposite sides (as in the vats 31). The vats are divided into compartments by the partitions 74. The draw offs 73 can be closed by the means described for closing the draw offs 35 and shown in detail in Figs. 8 and 9. Hose plugs 75, supplied by branches 76 of the brine pipe 37 are provided for the attachment of hose, in order to wash the salt from the compartments of said vats by streams of brine from said hose. Similar plugs (not shown) should be provided at the heads of the conduits 36 and 71, for washing out of them whatever salt may lodge therein. The conduit 71 leads to the receptacle (elevator pit) 77, from which the salt can be taken by an elevator and delivered by it or by other means to a centrifugal machine or to whatever receiver the salt maker may desire.

The brine from each of the vats 70 overflows into a trough 78 which empties into the trough 79; and from the trough 79 the brine passes by an overflow into the filter tank 81. If desired it may be allowed to return to the trough 34 by opening the gate 80; and the cataract pumps 60 will then deliver it again into the trough 61, from which it will flow into the trough 62 and thence again onto the upper part of the beds 64. Thus there is as shown a return conduit for delivering to the upper part of the salt-growing beds 64 brine which has passed over said bed.

The filter shown is composed of a number of elements, each of which (see Figs. 10 and 11) is constituted by a flat canvas bag 82 wrapped about a pipe 83 which is placed inside of the bag at one end of the same. Inside of the bags are distenders 84, in the form preferably of one or more sheets of coarse matting, for keeping apart the sides of the bags. The bags are closed on all sides except at the place where the pipe 83 passes out of the bag; and at this place a neck 85 is provided on the bag which neck is bound closely to the pipe. Each element is to be immersed completely in the brine in the filter tank. The brine filters through the bags from without inward, and enters the pipe 83 through the channels afforded by the distenders 84 or by the spaces between the pipe and the adjacent sides of the bag. The pipe 83 can be perforated; but it is not necessary that it should be so, if below the neck 85 it fits somewhat loosely in the bag. The wrappings (coils) of the bag should be kept together by a cord (not shown).

In practice the pores of the canvas composing the bag gradually become clogged, (mainly with the particles of calcium sulfate); and when this occurs the bags can be unrolled and their surfaces scrubbed to open again the pores of the canvas. The element can then be returned to its place in the filter tank.

The filter elements are removably secured by their pipes 83 to the manifolds 86, which are secured at one end to the manifold 87; and to this last the inlet or aspirating port of the pump 88 is secured. In the filter tank 81 is a closed steam coil 89 for raising the temperature of the brine somewhat, in order to prevent the deposition of salt in the pump 88 and pipes connected therewith. The discharge of pump 88 communicates with the pipe $q$. Instead of or in addition to the use of the closed steam coil in the filter tank, the brine can be sufficiently heated by injecting steam directly thereinto, either in the filter tank 81 or in the inlet pipe 88 or at an intermediate point.

As already described, the pipe $q$ leads to the heater $r$ and by the pipe line 2 to the heaters 7, 8 and 9, from which heaters the pipe $w$ or the return pipe line 3 and the pipe $w$ lead by branches 251, 250 and 25 to the sprinklers 26—27 in the evaporating chambers 21. Thus there is as shown a return conduit from below the salt-growing beds 64 to the sprinklers 26—27 by way of filter 81—87, pump 88, pipes $q$ and $w$, and the heaters between said pipes. Provision is also made, as shown, for a return conduit from the vats 31 directly to the sprinklers 26—27, as well as by including the salt-growing beds 64 and vats 70 as part of said conduit; for if the cataract pumps be stopped and the gate 80 be opened, the brine can flow from the trough 34 through the trough 79 to the filter tank 81. If it be desired to include one or both of the vats 70 in the circulation, to the exclusion of the salt-growing beds, a communicating trough (with a gate) can be constructed between the trough 34 and one or both of said vats 70.

The pipe 37 has a branch (Fig. 2$^a$) for delivering brine to the filter tank from a suitable source to supply the evaporation in the chambers 21 not supplied otherwise. For delivering the brine from the elevator pit 39 into the trough 79, a pump 398 (Fig. 2) and pipe 399 are provided; and for delivering the brine from the pit 77 there are shown the pump 778 (Fig. 2$^a$) and its discharge pipe; while the pipe 488 conveys into said trough 79 the brine which has aided the sifting and grinding operations (either or both). The brine from any or all of these pipes (namely the pipes 37, 399 and 488 and the discharge pipe of the pump 778) can be delivered into any part of the circulation between the last receiver in which brine is precipitated and the heaters $r$ and 7—9; and except for the reduction in the yield of salt, the said brine can be delivered into any other part of the circulation.

For drying the salt from the salt-growing bed, it is considered most advantageous to employ a kiln composed of a stack 90, with mixing chambers 92 (see Figs. 2$^a$ and 5) and oil burners therein. Each oil burner may consist of a steam or compressed air pipe 93 and an oil pipe 94 with its end at the side of the steam or air jet issuing from the pipe 93, after the well known manner of an atomizer; so that a blast of diffused oil will be directed toward stack 90. The pipe 95 around the ends of the pipes 93 and 94 is supported by arms so as to allow air to pass over its exterior. It is open at the ends for the passage of air through its interior. The air openings thus afforded are very much larger than suffices to admit simply the air to support combustion. This excess is necessary in order that, mingling with the products of the combustion, it may reduce the temperature of said products to the desired degree (preferably 300° F. to 400°), the excess of air being itself raised to the same degree. Valves or dampers can be provided to regulate the size of the air admission openings; and the steam or compressed air pipe 93 is shown as provided with a valve to regulate the steam jet and thus to control the delivery of the oil. The oil pipe could also be provided with a valve. Within each of the mixing chambers 92 are gratings or checker-work of fire brick 96, such as usual in regenerative gas furnaces. The object here is to insure the thorough mixing of the air and products of combustion, so as to have the mixture which enters the stack of uniform temperature throughout.

In the apparatus of Figs. 12–14, the sprinklers 26—27 are near the floor of the evaporating chamber 21, which is formed into a vat 31 provided with overflow 33, draw off 35 (Fig. 14) and hose plug 38 for washing out. The sprinklers do not deliver the brine vertically upward but with sufficient horizontal inclination, not only to fall clear of the sprinklers, but to cross the slow-moving current of air ascending through the chamber 21. The air-inducting fan 24 and its air duct 23 in these arrangements are at the top of the evaporation chamber, which is in the form of a large room, much larger in area of cross section than the air duct 23. The air enters at the bottom by the windows 210. Deflecting boards 211, above the windows 210, are shown for carrying the air into the shower of brine drops.

At the top of the evaporation chamber is a partition 404 which constitutes the bottom of the air duct 23, and below said partition is a trough 105 to collect and convey away the drip. In Fig. 14 the air-inducting fan 24 is shown as being driven by a small engine 245 by means of a belt 246. The draw off 35 empties directly into the elevator pit, in which is an elevator 356 for delivering the salt into a car 357. A trough 212 conveys the brine from the overflow 33 to inlet of the pump 128 which forces it by the pipe 110 into the first of a series of open tanks with a tubular steam heating drum 118 in each tank. The tanks are inter-connected by pipes 119 and 120; and the steam drums by the pipes 122 and 124 for steam, and the pipes 123 and 125 for the water of condensation. The engine 136, supplied with live steam by the pipe 113, exhausts through the pipe 99 into the first of the steam drums; the water of condensation and any uncondensed steam escape by the pipe 126 from the last steam drum of the series. At 114 is a by-pass for admitting live steam at will into the steam drum. At 115 is a safety valve. The pipe 117 supplies the heated brine to the pump 176 which supplies it under pressure through the pipe 177 to the horizontal pipes 178 for supplying the sprinklers 26—27. At 127 is a roof over the heating tanks. At 129 and 130 are pipes by which brine to supply the evaporation in the chamber 21 can be supplied from any suitable source.

In Fig. 15, the corresponding parts are marked for reference as in Fig. 12. In Fig. 15, however, a direct (injection) condenser is used to heat the brine and this (which becomes diluted as well as heated by the condensation of steam therein) is passed over salt to saturate it again (while retaining the heat imparted in said condenser, although with some loss of temperature). The steam from the engine 136 passes by the pipe 99 to the bottom of the heater, and ascends, passing back and forth around the baffles 111 and 112, which are shown as formed respectively of rings 111 and disks 112. The brine from the pipe 110 is delivered by a rose at the top of the heater, and descending meets the rising steam, condensing the same and carrying with itself the resulting water of condensation. Any uncondensed steam passes out by the pipe 116. The pump 176 delivers the heated (and diluted) brine by the pipe 330 to the body of salt (as for example an underground salt deposit) from which the brine returns saturated or nearly so and still at an elevated temperature, and is delivered by the pipes 178 and 210 to the sprinklers 26—27.

In Fig. 16, the vat 209 receives the brine which has been discharged into the overlying atmosphere through sprinklers in the form of upturned roses one of which is shown at 208. The screw conveyer 207 removes the salt from the bottom of the vat. The vat is to be provided with an overflow, and is to be used in connection with means for heating and returning the residual brine and with other parts of the apparatus of Figs. 1–11, or 12–15, as may be desired. So also while some of the apparatus shown in Figs. 1–11 has nothing to correspond therewith in Figs 12–15, it is not intended to imply that what is omitted from said figures is not useful with the form of apparatus shown therein: on the contrary, said figures are intended to show some of the modifications which can be made if desired in the corresponding portions of the apparatus of Figs. 1–11, those portions in whatever form to be employed when desired in connection with other portions of said apparatus. Inasmuch as the supersaturated brine is very ready to deposit salt, it is desirable to allow it to deposit in the proper receivers as much as may be practicable. Vats or other receivers for precipitation or settling, outside the evaporating chamber or chambers, can be used to any desired extent. Difficulty from supersaturation can in any case be avoided by injection of steam into the super-saturated brine, or if the supersaturation be not too great by heating with close steam coils or other dry heat.

Referring to Figs. 1–11, the brine to be evaporated is supplied (under appropriate pressure) from the pipe $w$ through one or more of the branch pipes 251, 250, and 25 to the corresponding sprinklers 26—27, which deliver it into the atmosphere of the corresponding chambers 21, in the form of drops that are unsupported in said atmosphere but pass through the same in virtue of their momentum or of the action of gravitation. The atmosphere in each chamber 21 is constantly renewed by the air which is supplied through the air ducts 23 by means of the air-inducting fans 24, and which after becoming laden with the moisture evaporated from the brine escapes at the tops of the chambers.

It is well known that water has a tendency (common to liquids in general) to convert itself into vapor; and that this tendency (herein termed vapor tension) corresponds with the pressure (tension) of the vapor able to be produced by said liquid. It is balanced and evaporation stopped by the presence above the liquid of its own vapor of a pressure (tension) equal to that which the liquid is able to produce. Simply to obtain evaporation it suffices to maintain between them a working difference of vapor tension. The present invention contemplates, however, the production of a supersaturated brine. For this the brine when exposed to the air must be at or near the point of saturation, preferably a little below so as to avoid precipitation of salt in the sprinklers; and further the size of the drops and the difference of the vapor tensions must be such that evaporation proceeds more rapidly than the precipitation of salt can take place. With the form of sprinklers shown, the size of the drops can be diminished by decreasing the size of the jet orifices 28 (Fig. 7) of the jet nozzles 26 and by increasing the hydraulic pressure of brine produced by pump 88 as shown and consequently the force with which the brine is projected against the spatter plates 27. The difference in the vapor tensions can be increased by raising the temperature of the brine, with or without (most conveniently without) heating the air. The smaller the drops and the larger the difference of the vapor tensions, the more rapid will be the rate of evaporation; and the same rate can be preserved (within limits) by changing either with a corresponding alteration of the other. A set of working figures has been given in the first part of this specification, and need not be here repeated. The figures can be varied so long as a proper rate of evaporation is retained. With vacuum steam (24 inches of mercury below atmospheric pressure) the brine can be heated to about 110° F. in each of the heaters $r$ and 7 and with steam of atmospheric pressure to about 160° F. more or less in the heaters 8 and 9. An evaporation of upward of 3% is obtainable by the working figures already given. The per cent. of evaporation in any case can be calculated from the loss of temperature (making due allowance for other sources of loss), and also from the quantity of salt which a sample of the partially evaporated brine will yield after standing. If it is desired to increase the degree of supersaturation of the partially evaporated brine, a further elevation of the temperature of the injected brine would be the simplest remedy in most cases, but an increase in the hydraulic pressure of the injected brine can also be resorted to, as well as the use of sprinklers with smaller jet orifices and of a freer supply of air. The brine drops must not be made so fine as to remain suspended in the air so as to be carried off or against the walls of the chamber by the current. With the large rooms 21 and the consequent slow motion of the air currents therein, difficulty from this source is the less readily encountered.

The brine from the pipe $q$ in passing through or over the tubes $a$ of the heater $r$ absorbs the heat which the steam from the boiling brine in the closed evaporator imparts to the opposite sides of said tubes and condenses the said steam at so low a temperature that a vacuum can be maintained in said closed evaporator for the production of vacuum salt therein. For further economy the brine in the closed evaporator $t$ is boiled by steam derived from the boiling brine in the closed evaporator $s$ wherein salt is also precipitated. The salt in both the closed evaporators settles into the appropriate leg $l$ and is removed in the ordinary way. By thus heating the brine for the evaporating chambers 21 by means of the steam arising from the brine in closed evaporators, and especially by making such heating the last effect in a multiple effect evaporating process and utilizing it for the production of a vacuum in aid of the preceding effect, great economy of manufacture is secured. The exhaust steam from engines at the salt works should also be utilized for heating the brine. But in many cases and perhaps in general the exhaust steam furnished by the salt works (even with the aid of such evaporation in closed evaporators as can be profitably carried on) may be insufficient to heat all the brine which might otherwise be profitably evaporated in the chambers 21. In such case, live steam could be used; but this would be a direct expense. By the pipe lines 2—3, the brine can be sent to outside premises, more or less distant as the case may be, and be returned therefrom in a heated state at a very small cost for the extra pumping, and without any loss to the owners of the outside premises, whose steam otherwise would go to waste. If the outside premises employ one or more condensing engines, the heating of the brine at such premises may be a positive gain to the owners in producing the vacuum for said engines without any cost to them.

The brine having been projected into and fallen through the evaporation-promoting atmosphere of the chamber 21, is received in the vats 31 where it remains long enough for the salt which may have precipitated in the brine drops to settle and for other salt to precipitate and settle. The brine in these vats is sufficiently quiet not to keep fine particles of salt from settling; and the working figures given being followed or other suitable conditions being obtained, coarse salt of skeleton form described in the earlier part of this specification deposits on the sloping bottoms 310 of the vats, together with the fine salt, also described above, which has been precipitated in the brine drops; while supersaturated brine still holding in solution about or above one-half percent. of salt above the amount necessary for saturation of the brine at its then temperature runs off by the overflows 33. If the working figures given above be followed, the brine should hold in supersolution upward of one percent. above saturation and be at about 100° F. in temperature. This would represent a loss of 50° F. if the temperature of the injected brine were about 150° F.: it would indicate an evaporation in the drops and in the pools in the vats of a little over five percent. of the brine injected, provided all the heat had been carried off by the evaporation; but in fact there are other sources of loss for which due allowance must be made.

After the salt has collected on the bottom 310 of any compartment to the desired depth say 12 to 18 inches, more or less, the delivery of brine to the sprinklers over that compartment is stopped, and the draw off 35 is opened. The mother brine runs off by the conduit 36 to the elevator pit 39 and is pumped out by the pump 398, an injection of steam into the inlet of the pump preventing the depositing of salt. The hose (not shown) is attached to one of the plugs 38 and a stream of ordinary, (not supersaturated) brine from the pipe 37 is directed against the salt deposit to wash it out of the vat, a portion at a time, and carry it into the elevator pit 39. From this pit the elevator 40 delivers it to the sieve 41—43 (submerged as to its lower part in the bath of the brine in the box 45) into which a stream of brine from the pipe 37 is run by opening the faucet 49 (Fig. 4) on the branch pipe 490. The brine aids the sieve in sifting the salt. The first sieve section 41 (of say 30 meshes to the inch) removes the fine salt which has been precipitated in the drops. It settles on the bottom of the first compartment of the box 45 and is removed by the elevator (not shown) in the bay 51 (Fig. 2ª). For use or sale, it can be dried more or less in any known or suitable way. The characteristics which distinguish it from any before known salt have been pointed out in the earlier part of this specification. The sieve sections 42 and 43 separate into two portions the salt which has both precipitated and settled in the vat 21. The finer portion (if the sieve section 42 have about 15 meshes to the linear inch) can be sold or used as common fine after drainage and storage in bins until its moisture content is sufficiently reduced. It can be removed by an elevator (not shown) in the bay 52 (Figs. 4 and 2ª). The coarser portion can also be removed for use or sale (after drainage or storage) in its coarse state. Of course, the coarse salt need not be sifted if not desired, but ordinarily it would be desired. The characteristics of the coarse salt which distinguish it from any before known salt have been pointed out in the earlier part of this specification.

If the coarser portion is to be ground, because of a better market for finer grades or for any reason, said coarser portion is lifted by the elevator 54 in the bay 53 and is delivered to the mill 55. It is impracticable in the ordinary way to grind wet salt, although its water content may be no more than is customary in the marketable product; and it would be expensive to dry it preparatory to grinding, when it does not have to be dry for sale. By the application of a larger supply of brine, which supply can be furnished by opening the faucet 56 (Fig. 4), on the branch 560 of the pipe 37, the wet salt from the elevator 54 can be ground at once. After grinding the salt may be prepared for use or sale by drainage or storage, or in any desired way. The brine from the box 45 of the sieve 41—43 is carried off by the pipe 488 into which (as shown) the brine from the mill 55 is delivered by the pipe 57.

The supersaturated brine which overflows from the vats 21 as before described is conveyed by the trough 34, cataract pump 60 and troughs 61 and 62, to the upper ends of one or more salt-growing beds 64 over whose breadth it is distributed by the distributing trough 62 in such manner that at all places the current is in such volume and at such speed that fine particles of salt being kept from settling, shall be carried along with the current. Salt out of the brine attaches itself to the boards 64 which it soon covers, and the said salt continues to grow as a compact columnar structure so long as the current of supersaturated brine flows over the beds. The depth to which the growth can be carried is apparently indefinite; but after a depth of twelve to fourteen inches more or less has been grown it will ordinarily be expedient to stop the flow and remove the formation. By having suitable gates to the notches of the distributing trough, the flow can be shut off from part of the bed while it continues on the other part. The separability (looseness) of the boards composing the bed, aids in taking up the salt, which can readily be removed in lumps by the aid of a pick or crow bar. The salt columns in these lumps are not very cohesive; so that even with the fingers they can be separated and broken.

The lumps (of convenient size) are placed in the stack 90 of the drying kiln, the supporting bars at the bottom of which are removable to allow the contents of the stack to be dumped after the drying operation is over. The spray of oil from the pipe 94 formed by the steam or air from the pipe 93 is ignited and the products of its combustion are mingled with the excess of air admitted through and over the pipe 95. The whole is thoroughly mixed and made of uniform temperature by the checker work 96, and enters the stack at a moderate temperature say 300° F. to 400° F. more or less. The combustion being perfect, and the oil (petroleum or a product therefrom) containing no ash, the gases admitted are practically pure carbonic acid, oxygen, nitrogen and water vapor. These pass up through the stack 90 around and between the lumps of salt, which gradually become dry and hard, the brine between the columns cementing them firmly together. When dry the salt is removed. The lumps can be broken into smaller lumps or not, or they can be so broken and then ground according to the size of particles, pieces or blocks desired. Should there be any special object to be attained, blocks of almost any size can be removed and in greater or less time be hardened by drying. The properties and characteristics which distinguish this compact salt from any known salt as well when it is in the non-cohesive condition which it has on first removal, as when it has been hardened by drying, are set forth in the earlier part of this specification.

The brine from the salt-growing bed flows into the vat 70 carrying with it the fine salt which has been precipitated therein while the brine is in motion. The fine salt settles to the bottom while the brine overflows at the notches 72 into the trough 78, which conveys it to the trough 79. When the fine salt has accumulated to the desired depth (say 12 inches more or less) in any compartment the brine may be drawn off therefrom and the deposit washed out of the same through the draw off 73 and conduit 71 to the receptacle (elevator pit) 77. From this the brine can be removed by the pump 778, and the salt by an elevator (not shown). The salt would best be subjected to the action of a centrifugal machine; but it may be treated in any desired way. The properties and characteristics of the salt which distinguish it from other known articles of salt have been given in the earlier part of this specification.

More or less of the residual brine in the trough 79 can if desired be returned to the upper ends of the salt-growing beds 64 by opening more or less the communication at 80, so that it will flow through the trough 34 to the cataract pumps 60 and be lifted again by them to the troughs 61 and 62, which feed the salt-growing beds. The residual brine, or such part of it as may not be returned to the salt-growing bed, flows into the filter tank 81 wherein it is heated by the close steam coil 89 sufficiently to be pumped without incrusting the valves and other parts. The brine (ordinarily) carries with it into the tank fine particles of calcium sulfate which have been precipitated in the chambers 21, vats 31 and other parts of the apparatus but which have been kept in suspension by the constant motion of the brine. This motion in the vats 31 and 70 and even in the conveying troughs 34, 61, 62, 78 and 79 has not been sufficient to keep the fine particles of salt which may be therein from settling; but the calcium sulfate precipitates in so much finer particles that the motion suffices to keep them (in large part if not wholly) in suspension in the brine.

From the tank 81 the brine is withdrawn through the filter elements 82, and manifolds 86 and 87, by the pump 88. It goes through the canvas 82 on both sides of the bags into the spaces occupied by the distenders (matting) 84 in which and between which and the sides of the bags are numerous passages for the conveyance of the brine to the pipes 83 at the inner ends of the bags. The canvas prevents the passage of the calcium sulfate particles. When these shall have stopped the pores of an element, or when it is judged advisable to clean an element, the same can be withdrawn from the tank 81, its bag unrolled and scrubbed on both sides and rewound, and the element restored, the opening in the manifold 86 being meanwhile closed by a plate.

The filtered brine is forced by the pump 88 through the pipe $q$, the heaters $r$, 7, and 8—9, and pipes $w$ and the branches of this latter pipe back to the sprinklers 26—27. Other brine, to supply that removed as water vapor and salt, is supplied to the circulation best at the filter tank, to which, as shown, there is a branch of the pipe 37 for delivering it into the tank. It is desirable for the purity of the products, that the brine when naturally contaminated with iron should be treated in known or suitable ways for its removal before the brine is admitted to the circulating system; and it is also desirable that the brine should at such time be as near saturation as practicable. The heaters $r$, 7, and 8—9 (ordinarily) become incrusted in their brine-holding chambers with calcium sulfate; the connections for brine and steam are therefore changed at intervals, so that after a change the steam condenses in contact with the incrustation (which it gradually eats off) while the brine absorbs the heat from a clean surface (which gradually becomes incrusted). A similar reversal is effected in the closed evaporators $s$, $t$.

Referring to Figs. 12, and 13, the heating is performed without removal of incrustation during and as a consequence of the heating operation; but the incrustation can be removed in the ordinary way. Two pumps are used because the brine tanks as shown are open. With open tanks a temperature above the boiling point of the brine cannot be attained; but as already observed while such superheating can be used it is not desirable. The brine is injected near the floor of the chamber 21; and it is exposed unsupported in drops to effect the evaporation of a suitable percentage of the water while so exposed to form the fine salt which is precipitated in the brine drops and the coarse salt of skeleton forms which is precipitated in the vat 31. The deposit of salt is washed out of this vat the same as from the vats 31 and 70 of Figs. 1–2$^a$. Should the so-moved deposit be lifted by elevator 356 to a car 357 it can be conveyed by this to a sieve and mill (either or both) such as described above with reference to Figs. 2$^a$ and 4. Of course the sieve and mill (either or both) could be so placed as to receive the salt directly from an elevator in the pit. Supersaturated brine from the vat 31 of Figs. 12 and 14 can be supplied to a salt-growing bed such as described above with reference to Figs. 1, 2$^a$; and the brine therefrom can be allowed to deposit the fine salt and then be filtered (as above described) before it is delivered to the tanks which hold the steam drums 118.

By directly condensing in the brine the steam which is to heat the same, as is done in the apparatus of Fig. 15 and hereinabove described with reference to said figure, the brine can be raised even above the temperature of the steam; because the affinity of the salt for moisture is such as to condense the steam even after the temperature thereof is reached. By appying such direct condensation to the last effect of a multiple (two or more) effect evaporating system (as for example in place of raising the temperature in the surface condensing heater $r$ of Figs. 1–2$^a$) a temperature of over 140° F. can be obtained with a vacuum in the preceding evaporator of about 24 inches of mercury below atmospheric temperature (that is, about 6 inches of mercury of positive pressure in the evaporator), the vacuum steam being about 135° F. in temperature. So also, such temperature of over 140° F. can be attained by condensing the vacuum steam from a condensing engine, which might be one (the condensing engine 4 of Fig. 2 for example) located at outside premises, the brine being carried to and from said premises by a direct and a return pipe line. The engine 176 of Fig. 15, may be either of the condensing or the non-condensing type. With exhaust steam at atmospheric pressure (temperature 212° F.) the residual brine can be heated almost to its boiling point (namely 220° F.). The brine being diluted has to be saturated again with salt; and the heating by direct condensation may therefore not be suitable for use under all circumstances.

Sprinklers of the form shown at 208 in Fig. 16 can be used if thought proper; and the salt deposit in any vat (as 209) can be removed by a screw conveyer such as indicated at 207 for delivery to a sieve and mill (either or both) such as above described. So also other known or suitable means for removing salt from pans (even labor with suitable hand implements) can be used for the removal of the salt deposit from any of the vats.

The present application is in part a continuation of my application of February 16, 1899, No. 705,604, for improvements in mining salt; inasmuch as it sets forth improvements some of which are and some of which are not set forth therein. The two applications are distinguished from each other, in respect to all matters common to both, by the fact that the mining of salt is no part of the invention to be secured by the patent to be granted hereon; although salt mining can be practiced in conjunction with the practice of said invention; and a salt mining process may consist in part of subject-matter herein claimed. On the other hand, the claims in my application of February 16, 1899, relate to the mining of salt. My said application of February 16, 1899, matured to patent December 24, 1907, as No. 874,906; and another patent for mining salt, No. 874,907, was granted on the same date on my application of November 13, 1899, renewed May 20, 1907.

I claim as my invention or discovery:—

1. The process of salt-making by exposing drops of saturated brine to an evaporation-promoting atmosphere under such conditions of size of brine drops and of difference of vapor tension between the brine and the atmospheric moisture that the evaporation of the water of the brine drops proceeds more rapidly than the crystallization of the salt and that the brine in consequence becomes supersaturated, and allowing such supersaturated brine to precipitate salt first while sufficiently quiet to permit the fine grains of salt to settle, and, secondly, while in sufficient motion to keep such fine grains from settling, substantially as described.

2. The process of salt-making by allowing supersaturated brine to precipitate salt while in sufficient motion to keep the fine grains of salt from settling, substantially as described.

3. The process of salt-making by exposing drops of saturated brine to an evaporation-promoting atmosphere under such conditions of size of brine drops and of difference of vapor tension between the brine and the atmospheric moisture that the evaporation of the water of the brine drops proceeds more rapidly than the crystallization of the salt and that the brine in consequence becomes supersaturated, and allowing the so obtained supersaturated brine to precipitate salt while in sufficient motion to keep the fine grains of salt from settling, substantially as described.

4. The process of salt-making by allowing supersaturated brine to precipitate salt while flowing over a salt-growing bed in such volume and at such speed that the fine grains of salt, being kept from settling, are carried along with the current, substantially as described.

5. The process of salt-making by exposing drops of saturated brine to an evaporation-promoting atmosphere under such conditions of size of brine drops and of difference of vapor tension between the brine and the atmospheric moisture that the evaporation of the water of the brine drops proceeds more rapidly than the crystallization of the salt and that the brine in consequence becomes supersaturated, and allowing the so obtained supersaturated brine to precipitate salt while flowing over a salt-growing bed in such volume and at such speed that the fine grains of salt, being kept from settling, are carried along with the current, substantially as described.

6. The process of salt-making by exposing drops of saturated brine to an evaporation-promoting atmosphere under such conditions of size of brine drops and of difference of vapor tension betwen the brine and the atmospheric moisture that the evaporation of the water of the brine drops proceeds more rapidly than the crystallization of the salt and that the brine in consequence becomes supersaturated, allowing such supersaturated brine to precipitate part of the salt of supersaturation while sufficiently quiet to permit the fine grains of salt to settle, and then allowing the brine in which such precipitation has taken place further to precipitate salt while flowing over a salt-growing bed in such volume and at such speed that the fine grains of salt, being kept from settling, are carried along with the current, substantially as described.

7. The process of salt-making, by forming a brine supersaturated to the extent of about one-half per cent. as a minimum in excess of saturation, and allowing said supersaturated brine to precipitate salt, substantially as described.

8. The process of preparing a supersaturated brine for salt-making, by exposing heated and saturated brine in the form of drops in size approximating those formed by delivery of a brine jet against an inclined spatter plate to an atmosphere in which the tension of the water vapor present is enough below the vapor tension of said brine for the latter to lose more than one per cent. of its water by evaporation thereof in the few seconds of time occupied by the drops in falling, substantially as described.

9. The process of preparing a supersaturated brine for salt-making, by exposing drops of heated and saturated brine to an atmosphere in which the tension of the water vapor present is enough below the vapor tension of said brine for the latter to lose more than one per cent. of its water by evaporation thereof in the few seconds of time occupied by the drops in falling, the brine being injected under pressure into said atmosphere and broken into small drops by reason of said pressure, substantially as described.

10. The process of salt-making, by exposing drops of saturated brine to an evaporation-promoting atmosphere under such conditions of size of brine drops and of difference of vapor tension between the brine and the atmospheric moisture that not only does the evaporation of the water of the brine drops proceed more rapidly than the crystallization of the salt, but that salt is precpitated in the drops of supersaturated brine, substantially as described.

11. The process of salt-making, by exposing drops of saturated brine to an evaporation-promoting atmosphere under such conditions of size of brine drops and of difference of vapor tension between the brine and the atmospheric moisture that not only does the evaporation of the water of the brine drops proceed more rapidly than the crystallization of the salt but that salt is precipitated in the drops of supersaturated brine, collecting the said drops in a body of brine, allowing salt to form in this body of brine, and separating the so-formed salt from that which was precipitated in the drops, substantially as described.

12. The process of salt-making, by exposing drops of saturated brine to an evaporation-promoting atmosphere under such conditions of size of brine drops and of difference of vapor tension between the brine and the atmospheric moisture that not only does the evaporation of the water of the brine drops proceed more rapidly than the crystallization of the salt, but that salt is precipitated in the drops of supersaturated brine, collecting the said drops in a body of brine, keeping the same sufficiently quiet for fine salt therein to settle, and sifting the resulting deposit to separate the fine salt which was precipitated in the drops from the salt which forms in the said body of brine during the settling operation, substantially as described.

13. The process of salt-making, by exposing drops of saturated brine to an evaporation-promoting atmosphere under such conditions of size of brine drops and of difference of vapor tension between the brine and the atmospheric moisture that the evaporation of the water of the brine drops proceeds more rapidly than the crystallization of the salt and that the brine in consequence becomes supersaturated, collecting the said drops in a body of brine, keeping the same sufficiently quiet for fine salt therein to settle, and sifting the resulting deposit, substantially as described.

14. The process of salt-making, by exposing drops of saturated brine to an evaporation-promoting atmosphere under such conditions of size of brine drops and of difference of vapor tension between the brine and the atmospheric moisture that the evaporation of the water of the brine drops proceeds more rapidly than the crystallization of the salt and that the brine in consequence becomes supersaturated, allowing such supersaturated brine to precipitate salt while sufficiently quiet to permit the fine grains of salt to settle, and sifting the so-obtained salt by the aid of a supply of brine, substantially as described.

15. The method of sifting salt, consisting in carrying it over a sieve submerged in brine by the aid of a current of brine flowing from one end of the sieve to the other in the same direction in which the salt travels, substantially as described.

16. The process of salt-making, by exposing drops of saturated brine to an evaporation-promoting atmosphere under such conditions of size of brine drops and of difference of vapor tension between the brine and the atmospheric moisture that the evaporation of the water of the brine drops proceeds more rapidly than the crystallization of the salt and that the brine in consequence becomes supersaturated, allowing such supersaturated brine to precipitate salt while sufficiently quiet to permit the fine grains of salt to settle, allowing the mother brine while still supersaturated to precipitate salt while flowing over a salt-growing bed in such volume and at such speed that the fine grains of salt, being kept from settling, are carried along with the current, allowing the fine salt so carried along to settle, drawing off the mother brine from the deposit of the first mentioned precipitation, subsequently washing the deposit into a receptacle by the aid of a stream of brine, subjecting the so-removed salt to operations whereby it is obtained in particles of similar size, drawing off the brine from the deposit of levigated salt, and washing this deposit into a receptacle by the aid of a stream of brine, substantially as described.

17. The process of salt-making, by exposing drops of saturated brine to an evaporation-promoting atmosphere under such conditions of size of brine drops and of difference of vapor tension between the brine and the atmospheric moisture that the evaporation of the water of the brine drops proceeds more rapidly than the crystallization of the salt and that the brine in consequence becomes supersaturated, allowing brine which contains salt of supersaturation as the result of said evaporation to precipitate salt while flowing over a salt-growing bed in such volume and at such speed that the fine grains of salt which form in the flowing brine, being kept from settling, are carried along with the current, and allowing the fine salt so-carried along to settle, substantially as described.

18. The process of salt-making, by exposing drops of saturated brine to an evaporation-promoting atmosphere under such conditions of size of brine drops and of difference of vapor tension between the brine and the atmospheric moisture that the evaporation of the water of the brine drops proceeds more rapidly than the crystallization of the salt and that the brine in consequence becomes supersaturated, allowing brine which contains salt of supersaturation as the result of said evaporation to precipitate salt while flowing over a salt-growing bed in such volume and at such speed that the fine grains of salt which form in the flowing brine, being kept from settling, are carried along with the current, allowing the fine salt so-carried along to settle, withdrawing the mother brine, and washing the salt deposit into a receptacle by the aid of a stream of brine, substantially as described.

19. The process of salt-making, by allowing supersaturated brine to precipitate salt while flowing over a salt-growing bed in such volume and at such speed that the fine grains of salt which form in the flowing brine, being kept from settling, are carried along with the current, allowing the said fine salt to settle, withdrawing the mother brine, and washing the salt deposit into a receptacle by the aid of a stream of brine, substantially as described.

20. The process of salt-making, by allowing supersaturated brine to precipitate salt while in sufficient motion to keep the fine grains of salt from settling, allowing the said fine salt to settle, withdrawing the mother brine, and washing the salt deposit into a receptacle by a stream of brine, substantially as described.

21. The process of salt-making, by allowing supersaturated brine to precipitate a part of its salt of supersaturation while sufficiently quiet to allow the fine grains of salt to settle, another part of its said salt while sufficiently in motion to prevent the fine grains of salt from settling, and a third part while flowing over a salt-growing bed in such volume and at such speed as to carry fine grains of salt along with the current, allowing the second mentioned part of the salt to settle, drawing off the mother brine from the deposits formed respectively by the first mentioned and the second mentioned precipitations, and washing each of these deposits into a receptacle by the aid of a stream of brine, substantially as described.

22. The process of salt-making, by allowing supersaturated brine to precipitate a part of its salt of supersaturation while sufficiently quiet to allow the fine grains of salt to settle, another part of its said salt while sufficiently in motion to prevent the fine grains of salt from settling, and a third part while flowing over a salt-growing bed in such volume and at such speed as to carry fine grains of salt along with the current, and allowing the second mentioned precipitate to settle, substantially as described.

23. The process of salt-making, by exposing drops of saturated brine to an evaporation-promoting atmosphere under such conditions of size of brine drops and of difference of vapor tension between the brine and the atmospheric moisture that the evaporation of the water of the brine drops proceeds more rapidly than the crystallization of the salt and that the brine in consequence becomes supersaturated, allowing such supersaturated brine to precipitate a part of its salt of supersaturation while sufficiently quiet to allow the fine grains of salt to settle, another part of its said salt while sufficiently in motion to prevent the fine grains of salt from settling, and a third part while flowing over a salt-growing bed in such volume and at such speed as to carry fine grains of salt along with the current, and allowing the second mentioned precipitate to settle, substantially as described.

24. The process of salt-making, by exposing drops of saturated brine to an evaporation-promoting atmosphere under such conditions of size of brine drops and of difference of vapor tension between the brine and the atmospheric moisture that the evaporation of the water of the brine drops proceeds more rapidly than the crystallization of the salt and that the brine in consequence becomes supersaturated, allowing such supersaturated brine to precipitate a part of its salt of supersaturation while sufficiently quiet to allow the fine grains of salt to settle, another part of its said salt while sufficiently in motion to prevent the fine grains of salt from settling, and a third part while flowing over a salt-growing bed in such volume and at such speed as to carry fine grains of salt along with the current, allowing the second mentioned part of the salt to settle, drawing off the mother brine from the deposits formed respectively by the first mentioned and the second mentioned precipitations, and washing each of these deposits into a receptacle by the aid of a stream of brine, substantially as described.

25. The process of salt-making, by exposing drops of saturated brine to an evaporation-promoting atmosphere under such conditions of size of brine drops and of difference of vapor tension between the brine and the atmospheric moisture that the evaporation of the water of the brine drops proceeds more rapidly than the crystallization of the salt and that the brine in consequence becomes supersaturated, allowing such supersaturated brine to precipitate a part of its salt of supersaturation while sufficiently quiet to allow the fine grains of salt to settle, yet with motion enough to hold the particles of calcium sulfate which are finer in suspension, another part of its said salt while sufficiently in motion to prevent the fine grains of salt from settling, and a third part while flowing over a salt-growing bed in such volume and at such speed as to carry fine grains of salt along with the current, allowing the second mentioned part of the salt to settle while the brine has sufficient motion to keep the particles of calcium sulfate in suspension, filtering the residual brine to separate the particles of calcium sulfate therefrom, returning the filtered brine to be exposed for evaporation in drops as before mentioned, drawing off the mother brine from the deposits formed respectively by the first mentioned and the second mentioned precipitations, and washing each of these deposits into a receptacle by the aid of a stream of brine, substantially as described.

26. The process of making salt, by exposing drops of saturated brine to an evaporation-promoting atmosphere under such conditions of size of brine drops and of difference of vapor tension between the brine and the atmospheric moisture that the evaporation of the water of the brine drops proceeds more rapidly than the crystallization of the salt and that the brine in consequence becomes supersaturated, allowing such supersaturated brine to precipitate salt and to separate itself therefrom by settling while the said brine is in sufficient motion to keep the particles of calcium sulfate in suspension, filtering the brine to separate therefrom the particles of calcium sulfate, and returning the filtered brine to be exposed for evaporation in drops, as before mentioned, substantially as described.

27. The process of making salt, by allowing a supersaturated brine to precipitate salt and to separate itself therefrom by settling while the brine is in sufficient motion to keep the particles of calcium sulfate in suspension, filtering the brine to separate the calcium sulfate therefrom, and returning the filtered brine for supersaturation again, substantially as described.

28. The process of making salt, by exposing saturated brine in an unsupported condition to an atmosphere in which the tension of the water vapor present is less than the vapor tension of said brine and effecting a precipitation of salt, allowing the salt to settle while the brine is kept in sufficient motion to hold the particles of calcium sulfate in suspension, filtering the brine to separate the calcium sulfate therefrom, and returning the filtered brine for evaporation, as before mentioned, substantially as described.

29. In salt-making wherein the brine is subjected to a round of partial evaporations of water and separations of salt, the improvement consisting in separating the salt by settling while the brine is in sufficient motion to keep the particles of calcium sulfate in suspension, filtering the brine, and returning the filtered brine for further partial evaporation, substantially as described.

30. The process of salt-making, by exposing drops of saturated brine to an evaporation-promoting atmosphere under such conditions of size of drops and of difference of vapor tension between the brine and the atmospheric moisture that the evaporation of the water of the brine drops proceeds more rapidly than the crystallization of the salt and that the brine in consequence becomes supersaturated, allowing such supersaturated brine to precipitate a part of its salt of supersaturation while sufficiently quiet to allow the fine grains of salt to settle, yet with motion enough to hold the particles of calcium sulfate which are finer in suspension, another part of its said salt while sufficiently in motion to prevent the fine grains of salt from settling, and a third part while flowing over a salt-growing bed in such volume and at such speed as to carry fine grains of salt along with the current, allowing the second mentioned part of the salt to settle while the brine has sufficient motion to keep the particles of calcium sulfate in suspension, filtering the residual brine to separate the calcium sulfate therefrom, heating said residual brine to avoid further precipitation, pumping the same back to said evaporation-promoting atmosphere, drawing off the mother brine from the deposits formed respectively by the first mentioned and the second mentioned precipitations, washing each of these deposits into a receptacle by a stream of brine, pumping the brine from said receptacle to said evaporation-promoting atmosphere, subjecting the deposit from the first mentioned precipitation to a sifting and a grinding operation, with the aid in each case of a supply of brine, and pumping the last mentioned brine to the evaporation-promoting atmosphere, substantially as described.

31. The process of salt-making, by exposing drops of saturated brine to an evaporation-promoting atmosphere under such conditions of size of drops and of difference of vapor tension between the brine and the atmospheric moisture that the evaporation of the water of the brine drops proceeds more rapidly than the crystallization of the salt and that the brine in consequence becomes supersaturated, allowing such supersaturated brine to precipitate salt and to separate itself therefrom, heating the residual or mother brine to avoid further precipitation, and pumping the said brine after said heating back to the said evaporation-promoting atmosphere, substantially as described.

32. The process of salt-making, by allowing supersaturated brine to precipitate salt and to separate itself therefrom, heating the residual or mother brine to avoid further precipitation, and pumping the said brine after said heating to a place of evaporation, substantially as described.

33. The process of salt-making, by exposing saturated brine in an unsupported condition to an evaporation-promoting atmosphere, separating the precipitated salt, evaporating other brine in a body by heat applied thereto, utilizing the residual brine from the first mentioned evaporation to condense the steam arising from said body of other brine and to form a vacuum above the same and the said steam to raise the temperature of said residual brine, and exposing the heated residual brine to said evaporation-promoting atmosphere, substantially as described.

34. The process of salt-making, by exposing saturated brine in an unsupported condition to an evaporation-promoting atmosphere, separating the precipitated salt, subjecting the residual brine to vacuum steam at such relative temperatures as that the said brine condenses said steam and is itself raised in temperature while maintaining the vacuum in which the said steam is generated, and exposing the heated residual brine to said evaporation-promoting atmosphere, substantially as described.

35. The process of salt-making, by exposing saturated brine in an unsupported condition to an evaporation - promoting atmosphere, separating the precipitated salt, subjecting the residual brine to vacuum steam at such relative temperatures as that the said brine condenses said steam and is itself raised in temperature while maintaining the vacuum in which the said steam is generated, subjecting the so-heated residual brine to steam of atmospheric pressure to raise still higher the temperature of said brine, and exposing the heated residual brine to said evaporation-promoting atmosphere, substantially as described.

36. The process of salt-making, by exposing saturated brine in an unsupported condition to an evaporation-promoting atmosphere, separating the precipitated salt, pumping the residual brine to a distance to outside premises, raising the temperature of said brine at said premises by condensation first of vacuum steam and then steam at atmospheric pressure, returning the so-heated brine to the salt works, and then exposing it to said evaporation-promoting atmosphere, substantially as described.

37. The process of salt-making, by evaporating saturated brine at the expense of heat stored therein, that is to say, in such manner that a direct consequence of the evaporation is to lower the brine's temperature, separating the precipitated salt, pumping the residual brine to a distance to outside premises, raising the temperature of said brine at said premises by causing it to condense first vacuum steam and then steam at atmospheric pressure, returning the so-heated brine to the salt works, and there subjecting it to evaporation at the expense of the heat brought back from said outside premises, substantially as described.

38. The process of salt-making, by allowing supersaturated brine to precipitate salt while flowing over a salt-growing bed in such volume and at such speed as to carry the fine grains of salt along with the current, removing the salt which grows in said current, and drying it by exposure to a moderately hot mixture of air and products of the combustion of petroleum or a fluid obtained therefrom, substantially as described.

39. The process of salt-making, by allowing supersaturated brine to precipitate salt while flowing over a salt-growing bed in such volume and at such speed as to carry the fine grains of salt along with the current, removing the salt which grows in said current, and drying it, substantially as described.

40. The process of salt-making, by injecting brine into a slow-moving current of air transversely to said current, and thereby exposing said brine in an unsupported condition as drops of saturated brine to the evaporation-promoting atmosphere composed of said air, in such manner as to form a supersaturated brine, renewing said atmosphere by air directed over the surface of a body of such supersaturated brine, allowing said brine to precipitate salt while flowing over a salt-growing bed in such volume and at such speed as to carry along the fine grains of salt, removing the salt grown in said current, and drying the same, substantially as described.

41. The process of salt-making, by exposing saturated brine in an unsupported condition to an evaporation-promoting atmosphere, and allowing the thereby partially evaporated brine to flow over a salt-growing bed, substantially as described.

42. The process of salt-making, by exposing saturated brine in an unsupported condition to an evaporation-promoting atmosphere, allowing the thereby partially evaporated brine to stand for a time and then to flow over a salt-growing bed, and recovering the salt precipitated previously as well as that grown on said bed, substantially as described.

43. The process of salt-making, by allowing supersaturated brine to precipitate salt while flowing over a salt growing bed, substantially as described.

44. The process of salt-making, by allowing supersaturated brine to precipitate salt while flowing over a salt-growing bed, removing the salt grown on said bed, and drying said salt, substantially as described.

45. The process of salt-making, by allowing supersaturated brine to precipitate salt while flowing over a salt-growing bed, removing the salt grown on said bed, and drying said salt at an artificially elevated temperature, substantially as described.

46. The process of salt-making, by allowing supersaturated brine to precipitate salt while flowing over a salt-growing bed, removing the salt grown on said bed, and drying said salt at a temperature above the boiling point of brine, substantially as described.

47. As a new article of manufacture, the highly lustrous and sparkling fine white salt composed of small cubes which severally under the microscope are altogether transparent, smooth surfaced, straight edged, and sharp cornered, substantially as described.

48. As a new article of manufacture, supersaturated brine adapted to serve industrially as a source of salt without loss of water or temperature, the same holding in solution above atmospheric temperature about one-half per cent. of salt above saturation as a minimum, substantially as described.

49. As a new article of manufacture, a coarse white salt, having particles of a semi-vitreous or sub-vitreous luster, of which particles a large number consist of plates united to each other along a line or axis at an angle of 120°, while some consist of three plates regularly arranged about such line or axis, the surfaces of said plates having grooves on their flat surfaces oblique to the said line or axis, substantially as described.

50. As a new article of manufacture, the compact salt, having a columnar structure and a specific gravity of about two, substantially as described.

51. As a new article of manufacture, the compact salt having a columnar structure with the columns firmly cemented together, a specific gravity of about two, and a hardness of about 2, being greater than that of gypsum and less than that of galena, and being distinguished from rock salt and solar salt by the smallness and lack of definition of the cubes composing the salt, which yet exhibits small crystal faces at intervals over the surfaces of the particles, lumps or blocks thereof, substantially as described.

52. As a new article of manufacture, the compact salt having a specific gravity of about two, and a hardness of about 2, being greater than that of gypsum and less than that of galena, and being distinguished from rock salt and solar salt by the smallness and lack of definition of the cubes composing the salt, which yet exhibits small crystal faces at intervals over the surfaces of the particles, lumps or blocks thereof, substantially as described.

53. As a new article of manufacture, the lustrous and sparkling very fine white salt which is composed of cubes under one two hundredths of an inch each way, substantially as described.

In testimony whereof I affix my signature, in presence of two witnesses.

HERMAN FRASCH.

Witnesses:
F. W. LOTHMAN,
J. C. UPDE GROVE.